US012198719B2

(12) United States Patent
Wang

(10) Patent No.: US 12,198,719 B2
(45) **Date of Patent: *Jan. 14, 2025**

(54) AUDIO SIGNAL CLASSIFICATION BASED ON FREQUENCY SPECTRUM FLUCTUATION

(71) Applicant: Huawei Technologies Co., Ltd., Shenzhen (CN)

(72) Inventor: Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,675

(22) Filed: Jul. 27, 2023

(65) Prior Publication Data

US 2024/0029757 A1 Jan. 25, 2024

Related U.S. Application Data

(63) Continuation of application No. 17/692,640, filed on Mar. 11, 2022, now Pat. No. 11,756,576, which is a (Continued)

(30) Foreign Application Priority Data

Aug. 6, 2013 (CN) ......................... 201310339218.5

(51) Int. Cl.
*G10L 25/81* (2013.01)
*G10L 19/06* (2013.01)
(Continued)

(52) U.S. Cl.
CPC .............. *G10L 25/81* (2013.01); *G10L 19/06* (2013.01); *G10L 19/12* (2013.01); *G10L 25/18* (2013.01);
(Continued)

(58) Field of Classification Search
CPC ................................ G10L 25/78; G10L 25/81
See application file for complete search history.

(56) References Cited

U.S. PATENT DOCUMENTS 6,167,372 A 12/2000 Maeda
6,570,991 B1 5/2003 Scheirer et al.
(Continued)

FOREIGN PATENT DOCUMENTS

CA 2501368 C 6/2013
CN 1815550 A 8/2006
(Continued)

OTHER PUBLICATIONS

Daniels, Michelle. "Classification of Percussive Sounds Using Wavelet-Based." CCRMA, Stanford University thesis (2010). (Year: 2010).*

(Continued)

*Primary Examiner* — Jialong He
(74) *Attorney, Agent, or Firm* — Conley Rose, P.C.

(57) ABSTRACT

An audio signal classification method includes determining, according to voice activity of a current audio frame, whether to obtain a frequency spectrum fluctuation of the current audio frame and store the frequency spectrum fluctuation in a frequency spectrum fluctuation memory, and updating, according to whether the audio frame is percussive music or activity of a historical audio frame, frequency spectrum fluctuations stored in the frequency spectrum fluctuation memory, and classifying the current audio frame as a speech frame or a music frame according to statistics of a part or all of effective data of the frequency spectrum fluctuations stored in the frequency spectrum fluctuation memory.

20 Claims, 11 Drawing Sheets

Related U.S. Application Data continuation of application No. 16/723,584, filed on Dec. 20, 2019, now Pat. No. 11,289,113, which is a continuation of application No. 16/108,668, filed on Aug. 22, 2018, now Pat. No. 10,529,361, which is a continuation of application No. 15/017,075, filed on Feb. 5, 2016, now Pat. No. 10,090,003, which is a continuation of application No. PCT/CN2013/084252, filed on Sep. 26, 2013.

(51) Int. Cl.
*G10L 19/12* (2013.01)
*G10L 25/18* (2013.01)
*G10L 25/78* (2013.01)

(52) U.S. Cl.
CPC ........ *G10L 25/78* (2013.01); *G10L 2025/783* (2013.01)

(56) References Cited

U.S. PATENT DOCUMENTS

| | | | |
|---|---|---|---|
| 6,658,383 B2 | 12/2003 | Koishida et al. | |
| 6,785,645 B2 | 8/2004 | Khalil et al. | |
| 7,809,560 B2 | 10/2010 | Yen et al. | |
| 8,050,916 B2 | 11/2011 | Liu et al. | |
| 8,380,498 B2 | 2/2013 | Gao | |
| 8,473,285 B2 | 6/2013 | Every et al. | |
| 8,892,231 B2 * | 11/2014 | Cheng | G10L 25/81 704/211 |
| 2002/0046026 A1 | 4/2002 | Kobayashi | |
| 2003/0009325 A1 | 1/2003 | Kirchherr et al. | |
| 2003/0101050 A1 | 5/2003 | Khalil et al. | |
| 2004/0128126 A1 | 7/2004 | Nam et al. | |
| 2005/0016360 A1 | 1/2005 | Zhang | |
| 2005/0159942 A1 | 7/2005 | Singhal | |
| 2005/0267746 A1 | 12/2005 | Jelinek et al. | |
| 2006/0136211 A1 | 6/2006 | Jiang et al. | |
| 2007/0083365 A1 | 4/2007 | Shmunk | |
| 2007/0223716 A1 | 9/2007 | Shirakawa et al. | |
| 2007/0271093 A1 | 11/2007 | Wang et al. | |
| 2008/0033583 A1 | 2/2008 | Zopf | |
| 2008/0162121 A1 | 7/2008 | Son et al. | |
| 2010/0004926 A1 | 1/2010 | Neoran et al. | |
| 2010/0063806 A1 | 3/2010 | Gao | |
| 2010/0088094 A1 | 4/2010 | Wang | |
| 2011/0035213 A1 | 2/2011 | Malenovsky et al. | |
| 2011/0046947 A1 | 2/2011 | Vaillancourt et al. | |
| 2011/0091043 A1 | 4/2011 | Wang | |
| 2011/0093260 A1 | 4/2011 | Liu et al. | |
| 2011/0132179 A1 | 6/2011 | Saino | |
| 2011/0184734 A1 | 7/2011 | Wang et al. | |
| 2011/0202337 A1 | 8/2011 | Fuchs et al. | |
| 2011/0313761 A1 | 12/2011 | Zhang et al. | |
| 2012/0016677 A1 | 1/2012 | Xu et al. | |
| 2012/0059650 A1 | 3/2012 | Faure et al. | |
| 2012/0158401 A1 | 6/2012 | Mazurenko et al. | |
| 2012/0197642 A1 | 8/2012 | Liu et al. | |
| 2012/0232896 A1 | 9/2012 | Taleb et al. | |
| 2012/0237042 A1 | 9/2012 | Hirohata et al. | |
| 2012/0303362 A1 | 11/2012 | Duni et al. | |
| 2013/0058488 A1 | 3/2013 | Cheng et al. | |
| 2013/0121662 A1 | 5/2013 | Moorer | |
| 2013/0185063 A1 | 7/2013 | Atti et al. | |
| 2013/0282367 A1 | 10/2013 | Wang | |
| 2013/0304464 A1 | 11/2013 | Wang | |
| 2015/0039304 A1 | 2/2015 | Wein | |
| 2015/0332667 A1 | 11/2015 | Mason | |
| 2016/0155456 A1 | 6/2016 | Wang | |
| 2017/0186460 A1 | 6/2017 | Kasada et al. | |

FOREIGN PATENT DOCUMENTS

| | | | |
|---|---|---|---|
| CN | 101197135 | A | 6/2008 |
| CN | 101221766 | A | 7/2008 |
| CN | 101393741 | A | 3/2009 |
| CN | 101546556 | A | 9/2009 |
| CN | 101546557 | A | 9/2009 |
| CN | 101615395 | A | 12/2009 |
| CN | 101944362 | A | 1/2011 |
| CN | 102044244 | A | 5/2011 |
| CN | 102044246 | A | 5/2011 |
| CN | 102098057 | A | 6/2011 |
| CN | 102413324 | A | 4/2012 |
| CN | 102446504 | A | 5/2012 |
| CN | 102543079 | A | 7/2012 |
| CN | 103021405 | A | 4/2013 |
| EP | 2096629 | A1 | 9/2009 |
| EP | 2339575 | A1 | 6/2011 |
| EP | 2355092 | A1 | 8/2011 |
| JP | 2002091468 | A | 3/2002 |
| JP | 2003036087 | A | 2/2003 |
| JP | 2010530989 | A | 9/2010 |
| JP | 2011514557 | A | 5/2011 |
| JP | 5277355 | B1 | 8/2013 |
| JP | 2017117505 | A | 6/2017 |
| KR | 20120000090 | A | 1/2012 |
| WO | 2011033597 | A1 | 3/2011 |

OTHER PUBLICATIONS

"Series G: Transmission Systems and Media, Digital Systems and Networks, Digital terminal equipments—Coding of voice and audio signals, Generic sound activity detector," ITU-T G. 720.1, Jan. 2010, 34 pages.
Al-Shoshan, A., et al., "Speech and Music Classification and Separation: A Review," Journal of King Saud University, vol. 19, No. 1, 2006, pp. 95-134.
Neuendorf, M., et al., "Unified speech and audio coding scheme for high quality at low bitrates," IEEE International Conference on Acoustics, Speech and Signal Processing, May 26, 2009, 4 pages.
Bessette, B., et al., "Universal speech/audio coding using hybrid ACELP/TCX techniques," Proceedings of International Conference on Acoustics, Speech, and Signal Processing, May 9, 2005, pp. 301-304.
Editor G.Gsad, "Draft new ITU-T Recomendation G.720.1(ex G.Gsad) Generic sound activity detector (for Consent)," Study Group 16, TD 186 (PLEN/16), XP050638609, Nov. 7, 2009, 26 pages.
Huakui, W., "Principles and Technologies of Mobile Communication," Tsinghua University Press, 2009, 10 pages.
Partial English Translation of Huakui, W., "Principles and Technologies of Mobile Communication," Tsinghua University Press, 2009, 3 pages.
Malenovsky, V., et al., "Improving the detection efficiency of the VMR-WB VAD algorithm on music signals," 2008 16th European Signal Processing Conference, Aug. 25-29, 2018, 5 pages.
Lu, Lie, et al., "Content analysis for audio classification and segmentation," IEEE Transactions on speech and audio processing 10.7 (2002): 504-516, (Year: 2002).
Raso, O., et al., "Comparison of Optimum Filter Length in Linear Prediction between Speech and Musical Signals," 34th International Conference on Telecommunications and Signal Processing (TSP), XP031975184, Aug. 18, 2011, pp. 355-360.
Cotton, C., "A Three-Feature Speech/Music Classification System," University Columbia, Dec. 14, 2006.
Thoshkahna, B., et al., "A Speech-Music Discriminator using HILN Model based features," IEEE International Conference on Acoustics Speech and Signal Processing Proceedings, vol. 5, 2006.

* cited by examiner

AUDIO SIGNAL CLASSIFICATION BASED ON FREQUENCY SPECTRUM FLUCTUATION

CROSS-REFERENCE TO RELATED APPLICATIONS

This is a continuation of U.S. patent application Ser. No. 17/692,640, filed on Mar. 11, 2022, now U.S. patent Ser. No. 11/756,576, which is a continuation of U.S. Patent application Ser. No. 16/723,584, filed on Dec. 20, 2019, now U.S. patent Ser. No. 11/289,113, which is a continuation of U.S. patent application Ser. No. 16/108,668, filed on Aug. 22, 2018, now U.S. patent application Ser. No. 10/529,361, which is a continuation of U.S. patent application Ser. No. 15/017,075, filed on Feb. 5, 2016, now U.S. patent Ser. No. 10/090,003, which is a continuation of Int'l Patent App. No. PCT/CN2013/084252, filed on Sep. 26, 2013, which claims priority to Chinese Patent App. No. 201310339218.5, filed on Aug. 6, 2013, all of which are incorporated by reference.

TECHNICAL FIELD

The present disclosure relates to the field of digital signal processing technologies, and in particular, to an audio signal classification method and apparatus.

BACKGROUND

To reduce resources occupied by a video signal during storage or transmission, an audio signal is compressed at a transmit end and then transmitted to a receive end, and the receive end restores the audio signal by means of decompressing.

In an audio processing application, audio signal classification is an important technology that is applied widely. For example, in an audio encoding/decoding application, a relatively popular codec is a type of hybrid of encoding and decoding currently. This codec generally includes an encoder (such as code-excited linear prediction (CELP)) based on a speech generating model and an encoder based on conversion (such as an encoder based on modified discrete cosine transform (MDCT)). At an intermediate or low bit rate, the encoder based on a speech generating model can obtain relatively good speech encoding quality, but has relatively poor music encoding quality, while the encoder based on conversion can obtain relatively good music encoding quality, but has relatively poor speech encoding quality. Therefore, the hybrid codec encodes a speech signal using the encoder based on a speech generating model, and encodes a music signal using the encoder based on conversion, thereby obtaining an optimal encoding effect on the whole. Herein, a core technology is audio signal classification, or encoding mode selection as far as this application is concerned.

The hybrid codec needs to obtain accurate signal type information before the hybrid codec can obtain optimal encoding mode selection. An audio signal classifier herein may also be roughly considered as a speech/music classifier. A speech recognition rate and a music recognition rate are important indicators for measuring performance of the speech/music classifier. Particularly for a music signal, due to diversity/complexity of its signal characteristics, recognition of the music signal is generally more difficult than that of a speech signal. In addition, a recognition delay is also one of the very important indicators. Due to fuzziness of characteristics of speech/music in a short time, it generally needs to take a relatively long time before the speech/music can be recognized relatively accurately. Generally, at an intermediate section of a same type of signals, a longer recognition delay indicates more accurate recognition. However, at a transition section of two types of signals, a longer recognition delay indicates lower recognition accuracy, which is especially severe in a situation in which a hybrid signal (such as a speech having background music) is input. Therefore, having both a high recognition rate and a low recognition delay is a necessary attribute of a high-performance speech/music recognizer. In addition, classification stability is also an important attribute that affects encoding quality of a hybrid encoder. Generally, when the hybrid encoder switches between different types of encoders, quality deterioration may occur. If frequent type switching occurs in a classifier in a same type of signals, encoding quality is affected relatively greatly. Therefore, it is required that an output classification result of the classifier should be accurate and smooth. Additionally, in some applications, such as a classification algorithm in a communications system, it is also required that calculation complexity and storage overheads of the classification algorithm should be as low as possible, to satisfy commercial requirements.

The International Telecommunication Union Telecommunication Standardization Sector (ITU-T) standard G.720.1 includes a speech/music classifier. This classifier uses a main parameter a frequency spectrum fluctuation variance (var_flux) as a main basis for signal classification, and uses two different frequency spectrum peakiness parameters p1 and p2 as an auxiliary basis. Classification of an input signal according to var_flux is completed in a First-in First-out (FIFO) var_flux buffer according to local statistics of var_flux. A specific process is summarized as follows. First, a frequency spectrum fluctuation flux is extracted from each input audio frame and buffered in a first buffer, and flux herein is calculated in four latest frames including a current input frame, or may be calculated using another method. Then, a variance of flux of N latest frames including the current input frame is calculated, to obtain var_flux of the current input frame, and var_flux is buffered in a second buffer. Then, a quantity K of frames whose var_flux is greater than a first threshold among M latest frames including the current input frame in the second buffer is counted. If a ratio of K to M is greater than a second threshold, the current input frame is a speech frame. Otherwise, the current input frame is a music frame. The auxiliary parameters p1 and p2 are mainly used to modify classification, and are also calculated for each input audio frame. When p1 and/or p2 is greater than a third threshold and/or a fourth threshold, it is directly determined that the current input audio frame is a music frame.

Disadvantages of this speech/music classifier are as follows. On one hand, an absolute recognition rate for music still needs to be improved, and on the other hand, because target applications of the classifier are not specific to an application scenario of a hybrid signal, there is also still room for improvement in recognition performance for a hybrid signal.

Many existing speech/music classifiers are designed based on a mode recognition principle. This type of classifiers generally extract multiple (a dozen to several dozens) characteristic parameters from an input audio frame, and feed these parameters into a classifier based on a Gaussian hybrid model, or a neural network, or another classical classification method to perform classification.

This type of classifiers has a relatively solid theoretical basis, but generally has relatively high calculation or storage complexity, and therefore, implementation costs are relatively high.

SUMMARY

An objective of embodiments of the present disclosure is to provide an audio signal classification method and apparatus, to reduce signal classification complexity while ensuring a classification recognition rate of a hybrid audio signal.

According to a first aspect, an audio signal classification method is provided, where the method includes determining, according to voice activity of a current audio frame, whether to obtain a frequency spectrum fluctuation of the current audio frame and store the frequency spectrum fluctuation in a frequency spectrum fluctuation memory, where the frequency spectrum fluctuation denotes an energy fluctuation of a frequency spectrum of an audio signal, updating, according to whether the audio frame is percussive music or activity of a historical audio frame, frequency spectrum fluctuations stored in the frequency spectrum fluctuation memory, and classifying the current audio frame as a speech frame or a music frame according to statistics of a part or all of effective data of the frequency spectrum fluctuations stored in the frequency spectrum fluctuation memory.

In a first possible implementation manner, the determining, according to voice activity of a current audio frame, whether to obtain a frequency spectrum fluctuation of the current audio frame and store the frequency spectrum fluctuation in a frequency spectrum fluctuation memory includes if the current audio frame is an active frame, storing the frequency spectrum fluctuation of the current audio frame in the frequency spectrum fluctuation memory.

In a second possible implementation manner, the determining, according to voice activity of a current audio frame, whether to obtain a frequency spectrum fluctuation of the current audio frame and store the frequency spectrum fluctuation in a frequency spectrum fluctuation memory includes if the current audio frame is an active frame, and the current audio frame does not belong to an energy attack, storing the frequency spectrum fluctuation of the current audio frame in the frequency spectrum fluctuation memory.

In a third possible implementation manner, the determining, according to voice activity of a current audio frame, whether to obtain a frequency spectrum fluctuation of the current audio frame and store the frequency spectrum fluctuation in a frequency spectrum fluctuation memory includes if the current audio frame is an active frame, and none of multiple consecutive frames including the current audio frame and a historical frame of the current audio frame belongs to an energy attack, storing the frequency spectrum fluctuation of the audio frame in the frequency spectrum fluctuation memory.

With reference to the first aspect or the first possible implementation manner of the first aspect or the second possible implementation manner of the first aspect or the third possible implementation manner of the first aspect, in a fourth possible implementation manner, the updating, according to whether the current audio frame is percussive music, frequency spectrum fluctuations stored in the frequency spectrum fluctuation memory includes if the current audio frame belongs to percussive music, modifying values of the frequency spectrum fluctuations stored in the frequency spectrum fluctuation memory.

With reference to the first aspect or the first possible implementation manner of the first aspect or the second possible implementation manner of the first aspect or the third possible implementation manner of the first aspect, in a fifth possible implementation manner, the updating, according to activity of a historical audio frame, frequency spectrum fluctuations stored in the frequency spectrum fluctuation memory includes if the frequency spectrum fluctuation of the current audio frame is stored in the frequency spectrum fluctuation memory, and a previous audio frame is an inactive frame, modifying data of other frequency spectrum fluctuations stored in the frequency spectrum fluctuation memory except the frequency spectrum fluctuation of the current audio frame into ineffective data, or if the frequency spectrum fluctuation of the current audio frame is stored in the frequency spectrum fluctuation memory, and three consecutive historical frames before the current audio frame are not all active frames, modifying the frequency spectrum fluctuation of the current audio frame into a first value, or if the frequency spectrum fluctuation of the current audio frame is stored in the frequency spectrum fluctuation memory, and a historical classification result is a music signal and the frequency spectrum fluctuation of the current audio frame is greater than a second value, modifying the frequency spectrum fluctuation of the current audio frame into the second value, where the second value is greater than the first value.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner, the classifying the current audio frame as a speech frame or a music frame according to statistics of a part or all of effective data of the frequency spectrum fluctuations stored in the frequency spectrum fluctuation memory includes obtaining an average value of a part or all of the effective data of the frequency spectrum fluctuations stored in the frequency spectrum fluctuation memory, and when the obtained average value of the effective data of the frequency spectrum fluctuations satisfies a music classification condition, classifying the current audio frame as a music frame. Otherwise, classifying the current audio frame as a speech frame.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a seventh possible implementation manner, the audio signal classification method further includes obtaining a frequency spectrum high-frequency-band peakiness, a frequency spectrum correlation degree, and a linear prediction residual energy tilt of the current audio frame, where the frequency spectrum high-frequency-band peakiness denotes a peakiness or an energy acutance, on a high frequency band, of a frequency spectrum of the current audio frame. The frequency spectrum correlation degree denotes stability, between adjacent frames, of a signal harmonic structure of the current audio frame, and the linear prediction residual energy tilt denotes an extent to which linear prediction residual energy of the audio signal changes as a linear prediction order increases, and determining, according to the voice activity of the current audio frame, whether to store the frequency spectrum high-frequency-band peakiness, the frequency spectrum correlation degree, and the linear prediction residual energy tilt in memories, where the classifying the audio frame according to statistics of a part or all of data of the frequency spectrum fluctuations stored in the frequency spectrum fluctuation memory includes obtaining an average value of the effective data of the stored frequency spectrum fluctuations, an average value of effective data of stored frequency spectrum high-frequency-band peakiness, an average value of effective data of stored frequency spectrum correlation degrees, and a variance of effective data of stored linear prediction residual energy tilts separately, and when one of the following conditions is satisfied, classifying the current audio frame as a music frame. Otherwise, classifying the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

According to a second aspect, an audio signal classification apparatus is provided, where the apparatus is configured to classify an input audio signal, and includes a storage determining unit configured to determine, according to voice activity of a current audio frame, whether to obtain and store a frequency spectrum fluctuation of the current audio frame, where the frequency spectrum fluctuation denotes an energy fluctuation of a frequency spectrum of an audio signal, a memory configured to store the frequency spectrum fluctuation when the storage determining unit outputs a result that the frequency spectrum fluctuation needs to be stored, an updating unit configured to update, according to whether the audio frame is percussive music or activity of a historical audio frame, frequency spectrum fluctuations stored in the memory, and a classification unit configured to classify the current audio frame as a speech frame or a music frame according to statistics of a part or all of effective data of the frequency spectrum fluctuations stored in the memory.

In a first possible implementation manner, the storage determining unit is further configured to, when the current audio frame is an active frame, output a result that the frequency spectrum fluctuation of the current audio frame needs to be stored.

In a second possible implementation manner, the storage determining unit is further configured to, when the current audio frame is an active frame, and the current audio frame does not belong to an energy attack, output a result that the frequency spectrum fluctuation of the current audio frame needs to be stored.

In a third possible implementation manner, the storage determining unit is further configured to, when the current audio frame is an active frame, and none of multiple consecutive frames including the current audio frame and a historical frame of the current audio frame belongs to an energy attack, output a result that the frequency spectrum fluctuation of the current audio frame needs to be stored.

With reference to the second aspect or the first possible implementation manner of the second aspect or the second possible implementation manner of the second aspect or the third possible implementation manner of the second aspect, in a fourth possible implementation manner, the updating unit is further configured to, if the current audio frame belongs to percussive music, modify values of the frequency spectrum fluctuations stored in the frequency spectrum fluctuation memory.

With reference to the second aspect or the first possible implementation manner of the second aspect or the second possible implementation manner of the second aspect or the third possible implementation manner of the second aspect, in a fifth possible implementation manner, the updating unit is further configured to, if the current audio frame is an active frame, and a previous audio frame is an inactive frame, modify data of other frequency spectrum fluctuations stored in the memory except the frequency spectrum fluctuation of the current audio frame into ineffective data, or if the current audio frame is an active frame, and three consecutive frames before the current audio frame are not all active frames, modify the frequency spectrum fluctuation of the current audio frame into a first value, or if the current audio frame is an active frame, and a historical classification result is a music signal and the frequency spectrum fluctuation of the current audio frame is greater than a second value, modify the frequency spectrum fluctuation of the current audio frame into the second value, where the second value is greater than the first value.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner, the classification unit includes a calculating unit configured to obtain an average value of a part or all of the effective data of the frequency spectrum fluctuations stored in the memory, and a determining unit configured to compare the average value of the effective data of the frequency spectrum fluctuations with a music classification condition, and when the average value of the effective data of the frequency spectrum fluctuations satisfies the music classification condition, classify the current audio frame as a music frame. Otherwise, classify the current audio frame as a speech frame.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a seventh possible implementation manner, the audio signal classification apparatus further includes a parameter obtaining unit configured to obtain a frequency spectrum high-frequency-band peakiness, a frequency spectrum correlation degree, a voicing parameter, and a linear prediction residual energy tilt of the current audio frame, where the frequency spectrum high-frequency-band peakiness denotes a peakiness or an energy acutance, on a high frequency band, of a frequency spectrum of the current audio frame. The frequency spectrum correlation degree denotes stability, between adjacent frames, of a signal harmonic structure of the current audio frame. The voicing parameter denotes a time domain correlation degree between the current audio frame and a signal before a pitch period, and the linear prediction residual energy tilt denotes an extent to which linear prediction residual energy of the audio signal changes as a linear prediction order increases, where the storage determining unit is further configured to determine, according to the voice activity of the current audio frame, whether to store the frequency spectrum high-frequency-band peakiness, the frequency spectrum correlation degree, and the linear prediction residual energy tilt in memories. The storage unit is further configured to, when the storage determining unit outputs a result that the frequency spectrum high-frequency-band peakiness, the frequency spectrum correlation degree, and the linear prediction residual energy tilt need to be stored, store the frequency spectrum high-frequency-band peakiness, the frequency spectrum correlation degree, and the linear prediction residual energy tilt. The classification unit is further configured to obtain statistics of effective data of the stored frequency spectrum fluctuations, statistics of effective data of stored frequency spectrum high-frequency-band peakiness, statistics of effective data of stored frequency spectrum correlation degrees, and statistics of effective data of stored linear prediction residual energy tilts, and classify the audio frame as a speech frame or a music frame according to the statistics of the effective data.

With reference to the seventh possible implementation manner of the second aspect, in an eighth possible implementation manner, the classification unit includes a calculating unit configured to obtain an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and a determining unit configured to, when one of the following conditions is satisfied, classify the current audio frame as a music frame. Otherwise, classify the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

According to a third aspect, an audio signal classification method is provided, where the method includes performing frame division processing on an input audio signal, obtaining a linear prediction residual energy tilt of a current audio frame, where the linear prediction residual energy tilt denotes an extent to which linear prediction residual energy of the audio signal changes as a linear prediction order increases, storing the linear prediction residual energy tilt in a memory, and classifying the audio frame according to statistics of a part of data of prediction residual energy tilts in the memory.

In a first possible implementation manner, before the storing the linear prediction residual energy tilt in a memory, the method further includes determining, according to voice activity of the current audio frame, whether to store the linear prediction residual energy tilt in the memory, and storing the linear prediction residual energy tilt in the memory when the linear prediction residual energy tilt needs to be stored.

With reference to the third aspect or the first possible implementation manner of the third aspect, in a second possible implementation manner, the statistics of the part of the data of the prediction residual energy tilts is a variance of the part of the data of the prediction residual energy tilts, and the classifying the audio frame according to statistics of a part of data of prediction residual energy tilts in the memory includes comparing the variance of the part of the data of the prediction residual energy tilts with a music classification threshold, and when the variance of the part of the data of the prediction residual energy tilts is less than the music classification threshold, classifying the current audio frame as a music frame. Otherwise, classifying the current audio frame as a speech frame.

With reference to the third aspect or the first possible implementation manner of the third aspect, in a third possible implementation manner, the audio signal classification method further includes obtaining a frequency spectrum fluctuation, a frequency spectrum high-frequency-band peakiness, and a frequency spectrum correlation degree of the current audio frame, and storing the frequency spectrum fluctuation, the frequency spectrum high-frequency-band peakiness, and the frequency spectrum correlation degree in corresponding memories, where the classifying the audio frame according to statistics of a part of data of prediction residual energy tilts in the memory includes obtaining statistics of effective data of stored frequency spectrum fluctuations, statistics of effective data of stored frequency spectrum high-frequency-band peakiness, statistics of effective data of stored frequency spectrum correlation degrees, and statistics of effective data of the stored linear prediction residual energy tilts, and classifying the audio frame as a speech frame or a music frame according to the statistics of the effective data, where the statistics of the effective data refer to a data value obtained after a calculation operation is performed on the effective data stored in the memories.

With reference to the third possible implementation manner of the third aspect, in a fourth possible implementation manner, the obtaining statistics of effective data of stored frequency spectrum fluctuations, statistics of effective data of stored frequency spectrum high-frequency-band peakiness, statistics of effective data of stored frequency spectrum correlation degrees, and statistics of effective data of the stored linear prediction residual energy tilts, and classifying the audio frame as a speech frame or a music frame according to the statistics of the effective data includes obtaining an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and when one of the following conditions is satisfied, classifying the current audio frame as a music frame. Otherwise, classifying the current audio frame as a speech frame: the average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

With reference to the third aspect or the first possible implementation manner of the third aspect, in a fifth possible implementation manner, the audio signal classification method further includes obtaining a frequency spectrum tone quantity of the current audio frame and a ratio of the frequency spectrum tone quantity on a low frequency band, and storing the frequency spectrum tone quantity and the ratio of the frequency spectrum tone quantity on the low frequency band in corresponding memories, where the classifying the audio frame according to statistics of a part of data of prediction residual energy tilts in the memory includes obtaining statistics of the stored linear prediction residual energy tilts and statistics of stored frequency spectrum tone quantities separately, and classifying the audio frame as a speech frame or a music frame according to the statistics of the linear prediction residual energy tilts, the statistics of the frequency spectrum tone quantities, and the ratio of the frequency spectrum tone quantity on the low frequency band, where the statistics refer to a data value obtained after a calculation operation is performed on data stored in the memories.

With reference to the fifth possible implementation manner of the third aspect, in a sixth possible implementation manner, the obtaining statistics of the stored linear prediction residual energy tilts and statistics of stored frequency spectrum tone quantities separately includes obtaining a variance of the stored linear prediction residual energy tilts, and obtaining an average value of the stored frequency spectrum tone quantities, and the classifying the audio frame as a speech frame or a music frame according to the statistics of the linear prediction residual energy tilts, the statistics of the frequency spectrum tone quantities, and the ratio of the frequency spectrum tone quantity on the low frequency band includes, when the current audio frame is an active frame, and one of the following conditions is satisfied, classifying the current audio frame as a music frame. Otherwise, classifying the current audio frame as a speech frame. The variance of the linear prediction residual energy tilts is less than a fifth threshold, or the average value of the frequency spectrum tone quantities is greater than a sixth threshold, or the ratio of the frequency spectrum tone quantity on the low frequency band is less than a seventh threshold.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect or the sixth possible implementation manner of the third aspect, in a seventh possible implementation manner, the obtaining a linear prediction residual energy tilt of a current audio frame includes obtaining the linear prediction residual energy tilt of the current audio frame according to the following formula:

$$\text{epsP\_tilt} = \frac{\sum_{i=1}^{n} epsP(i) \cdot epsP(i+1)}{\sum_{i=1}^{n} epsP(i) \cdot epsP(i)},$$

where epsP(i) denotes prediction residual energy of $i^{th}$-order linear prediction of the current audio frame, and n is a positive integer, denotes a linear prediction order, and is less than or equal to a maximum linear prediction order.

With reference to the fifth possible implementation manner of the third aspect or the sixth possible implementation manner of the third aspect, in an eighth possible implementation manner, the obtaining a frequency spectrum tone quantity of the current audio frame and a ratio of the frequency spectrum tone quantity on a low frequency band includes counting a quantity of frequency bins of the current audio frame that are on a frequency band from 0 to 8 kilohertz (kHz) and have frequency bin peak values greater than a predetermined value, to use the quantity as the frequency spectrum tone quantity, and calculating a ratio of a quantity of frequency bins of the current audio frame that are on a frequency band from 0 to 4 kHz and have frequency bin peak values greater than the predetermined value to the quantity of the frequency bins of the current audio frame that are on the frequency band from 0 to 8 kHz and have frequency bin peak values greater than the predetermined value, to use the ratio as the ratio of the frequency spectrum tone quantity on the low frequency band.

According to a fourth aspect, a signal classification apparatus is provided, where the apparatus is configured to classify an input audio signal, and includes a frame dividing unit configured to perform frame division processing on an input audio signal, a parameter obtaining unit configured to obtain a linear prediction residual energy tilt of a current audio frame, where the linear prediction residual energy tilt denotes an extent to which linear prediction residual energy of the audio signal changes as a linear prediction order increases, a storage unit configured to store the linear prediction residual energy tilt, and a classification unit configured to classify the audio frame according to statistics of a part of data of prediction residual energy tilts in a memory.

In a first possible implementation manner, the signal classification apparatus further includes a storage determining unit configured to determine, according to voice activity of a current audio frame, whether to store the linear prediction residual energy tilt in the memory, where the storage unit is further configured to, when the storage determining unit determines that the linear prediction residual energy tilt needs to be stored, store the linear prediction residual energy tilt in the memory.

With reference to the fourth aspect or the first possible implementation manner of the fourth aspect, in a second possible implementation manner, the statistics of the part of the data of the prediction residual energy tilts is a variance of the part of the data of the prediction residual energy tilts, and the classification unit is further configured to compare the variance of the part of the data of the prediction residual energy tilts with a music classification threshold, and when the variance of the part of the data of the prediction residual energy tilts is less than the music classification threshold, classify the current audio frame as a music frame. Otherwise, classify the current audio frame as a speech frame.

With reference to the fourth aspect or the first possible implementation manner of the fourth aspect, in a third possible implementation manner, the parameter obtaining unit is further configured to obtain a frequency spectrum fluctuation, a frequency spectrum high-frequency-band peakiness, and a frequency spectrum correlation degree of the current audio frame, and store the frequency spectrum fluctuation, the frequency spectrum high-frequency-band peakiness, and the frequency spectrum correlation degree in corresponding memories. The classification unit is further configured to obtain statistics of effective data of stored frequency spectrum fluctuations, statistics of effective data of stored frequency spectrum high-frequency-band peakiness, statistics of effective data of stored frequency spectrum correlation degrees, and statistics of effective data of the stored linear prediction residual energy tilts, and classify the audio frame as a speech frame or a music frame according to the statistics of the effective data, where the statistics of the effective data refer to a data value obtained after a calculation operation is performed on the effective data stored in the memories.

With reference to the third possible implementation manner of the fourth aspect, in a fourth possible implementation manner, the classification unit includes a calculating unit configured to obtain an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately. A determining unit configured to, when one of the following conditions is satisfied, classify the current audio frame as a music frame. Otherwise, classify the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

With reference to the fourth aspect or the first possible implementation manner of the fourth aspect, in a fifth possible implementation manner, the parameter obtaining unit is further configured to obtain a frequency spectrum tone quantity of the current audio frame and a ratio of the frequency spectrum tone quantity on a low frequency band, and store the frequency spectrum tone quantity and the ratio of the frequency spectrum tone quantity on the low frequency band in memories, and the classification unit is further configured to obtain statistics of the stored linear prediction residual energy tilts and statistics of stored frequency spectrum tone quantities separately, and classify the audio frame as a speech frame or a music frame according to the statistics of the linear prediction residual energy tilts, the statistics of the frequency spectrum tone quantities, and the ratio of the frequency spectrum tone quantity on the low frequency band, where the statistics of the effective data refer to a data value obtained after a calculation operation is performed on data stored in the memories.

With reference to the fifth possible implementation manner of the fourth aspect, in a sixth possible implementation manner, the classification unit includes a calculating unit configured to obtain a variance of effective data of the stored linear prediction residual energy tilts and an average value of the stored frequency spectrum tone quantities, and a determining unit configured to when the current audio frame is an active frame, and one of the following conditions is satisfied, classify the current audio frame as a music frame. Otherwise, classify the current audio frame as a speech frame. The variance of the linear prediction residual energy tilts is less than a fifth threshold, or the average value of the frequency spectrum tone quantities is greater than a sixth threshold, or the ratio of the frequency spectrum tone quantity on the low frequency band is less than a seventh threshold.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect or the sixth possible implementation manner of the fourth aspect, in a seventh possible implementation manner, the parameter obtaining unit obtains the linear prediction residual energy tilt of the current audio frame according to the following formula:

$$\text{epsP\_tilt} = \frac{\sum_{i=1}^{n} epsP(i) \cdot epsP(i+1)}{\sum_{i=1}^{n} epsP(i) \cdot epsP(i)},$$

where epsP(i) denotes prediction residual energy of $i^{th}$-order linear prediction of the current audio frame, and n is a positive integer, denotes a linear prediction order, and is less than or equal to a maximum linear prediction order.

With reference to the fifth possible implementation manner of the fourth aspect or the sixth possible implementation manner of the fourth aspect, in an eighth possible implementation manner, the parameter obtaining unit is configured to count a quantity of frequency bins of the current audio frame that are on a frequency band from 0 to 8 kHz and have frequency bin peak values greater than a predetermined value, to use the quantity as the frequency spectrum tone quantity, and the parameter obtaining unit is configured to calculate a ratio of a quantity of frequency bins of the current audio frame that are on a frequency band from 0 to 4 kHz and have frequency bin peak values greater than the predetermined value to the quantity of the frequency bins of the current audio frame that are on the frequency band from 0 to 8 kHz and have frequency bin peak values greater than the predetermined value, to use the ratio as the ratio of the frequency spectrum tone quantity on the low frequency band.

In the embodiments of the present disclosure, an audio signal is classified according to long-time statistics of frequency spectrum fluctuations. Therefore, there are relatively few parameters, a recognition rate is relatively high, and complexity is relatively low. In addition, the frequency spectrum fluctuations are adjusted with consideration of factors such as voice activity and percussive music. Therefore, the present disclosure has a higher recognition rate for a music signal, and is suitable for hybrid audio signal classification.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the field of digital signal processing, audio codecs and video codecs are widely applied in various electronic devices, for example, a mobile phone, a wireless apparatus, a personal digital assistant (PDA), a handheld or portable computer, a global positioning system (GPS) receiver/navigator, a camera, an audio/video player, a video camera, a video recorder, and a monitoring device. Generally, this type of electronic device includes an audio encoder or an audio decoder, where the audio encoder or decoder may be directly implemented by a digital circuit or a chip, for example, a digital signal processor (DSP), or be implemented by software code driving a processor to execute a process in the software code. In an audio encoder, an audio signal is first classified, different types of audio signals are encoded in different encoding modes, and then a bitstream obtained after the encoding is transmitted to a decoder side.

Figure 1:
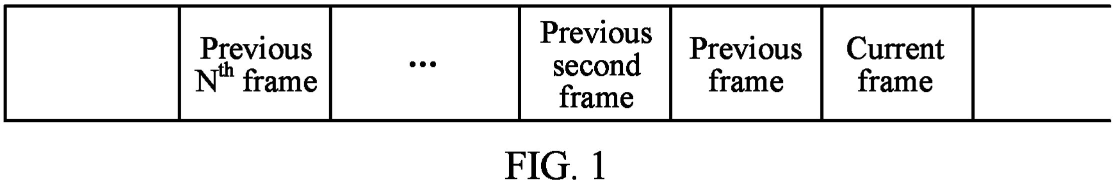
FIG. 1 is a schematic diagram of dividing an audio signal into frames.

Generally, an audio signal is processed in a frame division manner, and each frame of signal represents an audio signal of a specified duration. Referring to FIG. 1, an audio frame that is currently input and needs to be classified may be referred to as a current audio frame, and any audio frame before the current audio frame may be referred to as a historical audio frame. According to a time sequence from the current audio frame to historical audio frames, the historical audio frames may sequentially become a previous audio frame, a previous second audio frame, a previous third audio frame, and a previous $N^{th}$ audio frame, where N is greater than or equal to four.

In this embodiment, an input audio signal is a broadband audio signal sampled at 16 kHz, and the input audio signal is divided into frames using 20 milliseconds (ms) as a frame, that is, each frame has 320 time domain sampling points. Before a characteristic parameter is extracted, an input audio signal frame is first downsampled at a sampling rate of 12.8 kHz, that is, there are 256 sampling points in each frame. Each input audio signal frame in the following refers to an audio signal frame obtained after downsampling.

Figure 2:
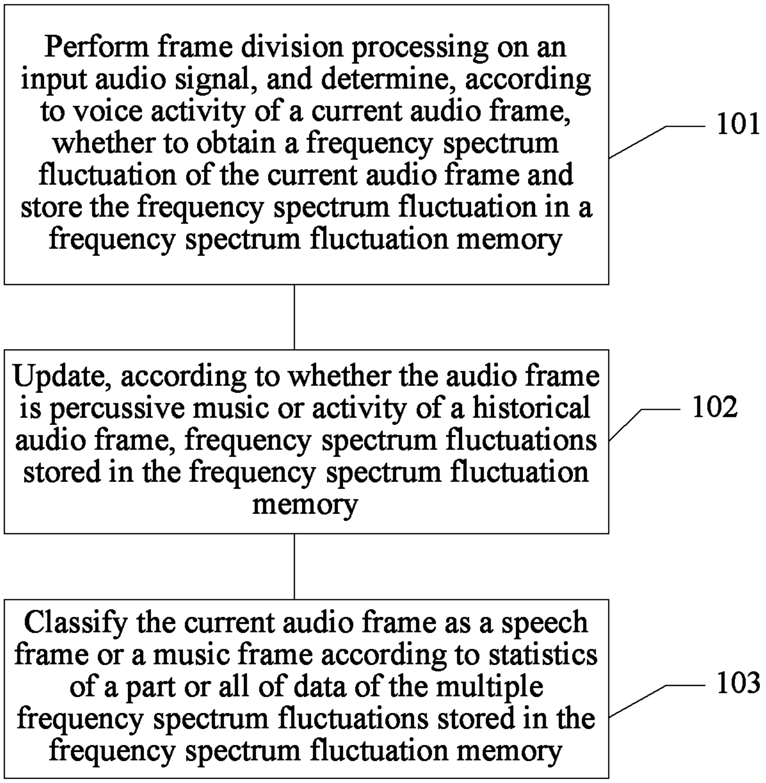
FIG. 2 is a schematic flowchart of an embodiment of an audio signal classification method according to the present disclosure.

Referring to FIG. 2, an embodiment of an audio signal classification method includes the following steps.

Step 101: Perform frame division processing on an input audio signal, and determine, according to voice activity of a current audio frame, whether to obtain a frequency spectrum fluctuation of the current audio frame and store the frequency spectrum fluctuation in a frequency spectrum fluctuation memory, where the frequency spectrum fluctuation denotes an energy fluctuation of a frequency spectrum of an audio signal.

Audio signal classification is generally performed on a per frame basis, and a parameter is extracted from each audio signal frame to perform classification, to determine whether the audio signal frame belongs to a speech frame or a music frame, and perform encoding in a corresponding encoding mode. In an embodiment, a frequency spectrum fluctuation of a current audio frame may be obtained after frame division processing is performed on an audio signal, and then it is determined according to voice activity of the current audio frame whether to store the frequency spectrum fluctuation in a frequency spectrum fluctuation memory. In another embodiment, after frame division processing is performed on an audio signal, it may be determined according to voice activity of a current audio frame whether to store a frequency spectrum fluctuation in a frequency spectrum fluctuation memory, and when the frequency spectrum fluctuation needs to be stored, the frequency spectrum fluctuation is obtained and stored.

The frequency spectrum fluctuation flux denotes a short-time or long-time energy fluctuation of a frequency spectrum of a signal, and is an average value of absolute values of logarithmic energy differences between corresponding frequencies of a current audio frame and a historical frame on a low and mid-band spectrum, where the historical frame refers to any frame before the current audio frame. In an embodiment, a frequency spectrum fluctuation is an average value of absolute values of logarithmic energy differences between corresponding frequencies of a current audio frame and a historical frame of the current audio frame on a low and mid-band spectrum. In another embodiment, a frequency spectrum fluctuation is an average value of absolute values of logarithmic energy differences between corresponding frequency spectrum peak values of a current audio frame and a historical frame on a low and mid-band spectrum.

Figure 3:
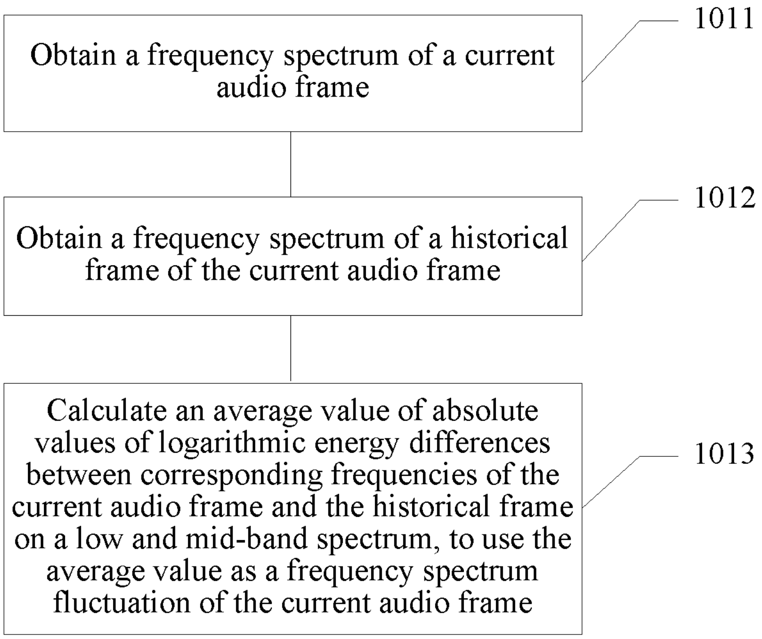
FIG. 3 is a schematic flowchart of an embodiment of obtaining a frequency spectrum fluctuation according to the present disclosure.

Referring to FIG. 3, an embodiment of obtaining a frequency spectrum fluctuation includes the following steps.

Step 1011: Obtain a frequency spectrum of a current audio frame.

In an embodiment, a frequency spectrum of an audio frame may be directly obtained. In another embodiment, frequency spectrums, that is, energy spectrums, of any two subframes of a current audio frame are obtained, and a frequency spectrum of the current audio frame is obtained using an average value of the frequency spectrums of the two subframes.

Step 1012: Obtain a frequency spectrum of a historical frame of the current audio frame.

The historical frame refers to any audio frame before the current audio frame, and may be the third audio frame before the current audio frame in an embodiment.

Step 1013: Calculate an average value of absolute values of logarithmic energy differences between corresponding frequencies of the current audio frame and the historical frame on a low and mid-band spectrum, to use the average value as a frequency spectrum fluctuation of the current audio frame.

In an embodiment, an average value of absolute values of differences between logarithmic energy of all frequency bins of a current audio frame on a low and mid-band spectrum and logarithmic energy of corresponding frequency bins of a historical frame on the low and mid-band spectrum may be calculated.

In another embodiment, an average value of absolute values of differences between logarithmic energy of frequency spectrum peak values of a current audio frame on a low and mid-band spectrum and logarithmic energy of corresponding frequency spectrum peak values of a historical frame on the low and mid-band spectrum may be calculated.

The low and mid-band spectrum is, for example, a frequency spectrum range of 0 to (fs)/4 or 0 to fs/3, where fs is femtosecond.

An example in which an input audio signal is a broadband audio signal sampled at 16 kHz and the input audio signal uses 20 ms as a frame is used, former fast Fourier transform (FFT) of 256 points and latter FFT of 256 points are performed on a current audio frame of every 20 ms, two FFT windows are overlapped by 50%, and frequency spectrums (energy spectrums) of two subframes of the current audio frame are obtained, and are respectively marked as $C^0(i)$ and $C^1(i)$, i=0, 1, . . . , 127, where $C^x(i)$ denotes a frequency spectrum of an $x^{th}$ subframe. Data of a second subframe of a previous frame needs to be used for FFT of a first subframe of the current audio frame, where $$C^x(i)=rel^2(i)+img^2(i),$$

where rel(i) and img(i) denote a real part and an imaginary part of an FFT coefficient of the $i^{th}$ frequency bin respectively. The frequency spectrum C(i) of the current audio frame is obtained by averaging the frequency spectrums of the two subframes, where $$C(i)=\tfrac{1}{2}(C^0(i)+C^1(i)).$$

The frequency spectrum fluctuation flux of the current audio frame is an average value of absolute values of logarithmic energy differences between corresponding frequencies of the current audio frame and a frame 60 ms ahead of the current audio frame on a low and mid-band spectrum in an embodiment, and the interval may not be 60 ms in another embodiment, where $$\text{flux} = \frac{1}{42}\sum_{i=0}^{42}[10\log(C(i)) - 10\log(C_{-3}(i))],$$

where $C_{-3}(i)$ denotes a frequency spectrum of the third historical frame before the current audio frame, that is, a historical frame 60 ms ahead of the current audio frame when a frame length is 20 ms in this embodiment. Each form similar to $X_{-n}(\ )$ in this specification denotes a parameter X of the $n^{th}$ historical frame of the current audio frame, and a subscript 0 may be omitted for the current audio frame. log(·) denotes a logarithm with 10 as a base.

In another embodiment, the frequency spectrum fluctuation flux of the current audio frame may also be obtained using the following method, that is, the frequency spectrum fluctuation flux is an average value of absolute values of logarithmic energy differences between corresponding frequency spectrum peak values of the current audio frame and a frame 60 ms ahead of the current audio frame on a low and mid-band spectrum, where $$\text{flux} = \frac{1}{K}\sum_{i=0}^{K}[10\log(P(i)) - 10\log(P_{-3}(i))],$$

where P(i) denotes energy of the $i^{th}$ local peak value of the frequency spectrum of the current audio frame, a frequency bin at which a local peak value is located is a frequency bin, on the frequency spectrum, whose energy is greater than energy of an adjacent higher frequency bin and energy of an adjacent lower frequency bin, and K denotes a quantity of local peak values on the low and mid-band spectrum.

The determining, according to voice activity of a current audio frame, whether to store a frequency spectrum fluctuation in a frequency spectrum fluctuation memory may be implemented in multiple manners.

In an embodiment, if a voice activity parameter of the audio frame denotes that the audio frame is an active frame, the frequency spectrum fluctuation of the audio frame is stored in the frequency spectrum fluctuation memory. Otherwise, the frequency spectrum fluctuation is not stored.

In another embodiment, it is determined, according to the voice activity of the audio frame and whether the audio frame is an energy attack, whether to store the frequency spectrum fluctuation in the memory. If a voice activity parameter of the audio frame denotes that the audio frame is an active frame, and a parameter denoting whether the audio frame is an energy attack denotes that the audio frame does not belong to an energy attack, the frequency spectrum fluctuation of the audio frame is stored in the frequency spectrum fluctuation memory. Otherwise, the frequency spectrum fluctuation is not stored. In another embodiment, if the current audio frame is an active frame, and none of multiple consecutive frames including the current audio frame and a historical frame of the current audio frame belongs to an energy attack, the frequency spectrum fluctuation of the audio frame is stored in the frequency spectrum fluctuation memory. Otherwise, the frequency spectrum fluctuation is not stored. For example, if the current audio frame is an active frame, and none of the current audio frame, a previous audio frame and a previous second audio frame belongs to an energy attack, the frequency spectrum fluctuation of the audio frame is stored in the frequency spectrum fluctuation memory. Otherwise, the frequency spectrum fluctuation is not stored.

A voice activity flag (vad_flag) denotes whether a current input signal is an active foreground signal (speech, music, or the like) or a silent background signal (such as background noise or mute) of a foreground signal, and is obtained by a voice activity detector (VAD). vad_flag=1 denotes that the input signal frame is an active frame, that is, a foreground signal frame. Otherwise, vad_flag=0 denotes a background signal frame. A specific algorithm of the VAD is not described in detail herein.

A voice attack flag (attack_flag) denotes whether the current audio frame belongs to an energy attack in music. When several historical frames before the current audio frame are mainly music frames, if frame energy of the current audio frame increases relatively greatly relative to that of a first historical frame before the current audio frame, and increases relatively greatly relative to average energy of audio frames that are within a period of time ahead of the current audio frame, and a time domain envelope of the current audio frame also increases relatively greatly relative to an average envelope of audio frames that are within a period of time ahead of the current audio frame, it is considered that the current audio frame belongs to an energy attack in music.

According to the voice activity of the current audio frame, the frequency spectrum fluctuation of the current audio frame is stored only when the current audio frame is an active frame, which can reduce a misjudgment rate of an inactive frame, and improve a recognition rate of audio classification.

When the following conditions are satisfied, attack_flag is set to 1, that is, it denotes that the current audio frame is an energy attack in a piece of music:

$$\begin{cases} etot - etot_{-1} > 6 \\ etot - \text{lp\_speec} > 5 \\ \text{mode}_{mov} > 0.9 \\ \text{log\_max\_spl} - \text{mov\_log\_max\_spl} > 5 \end{cases},$$

where etot denotes logarithmic frame energy of the current audio frame, $etot_{-1}$ denotes logarithmic frame energy of a previous audio frame, lp_speech denotes a long-time moving average of the etot, log_max_spl and mov_log_max_spl denotes a time domain maximum logarithmic sampling point amplitude of the current audio frame and a long-time moving average of the time domain maximum logarithmic sampling point amplitude respectively, and mode_mov denotes a long-time moving average of historical final classification results in signal classification.

The meaning of the foregoing formula is, when several historical frames before the current audio frame are mainly music frames, if frame energy of the current audio frame increases relatively greatly relative to that of a first historical frame before the current audio frame, and increases relatively greatly relative to average energy of audio frames that are within a period of time ahead of the current audio frame, and a time domain envelope of the current audio frame also increases relatively greatly relative to an average envelope of audio frames that are within a period of time ahead of the current audio frame, it is considered that the current audio frame belongs to an energy attack in music.

The etot is denoted by logarithmic total subband energy of an input audio frame:

$$etot = 10\log\left(\sum_{j=0}^{19}\left[\frac{1}{hb(j)-lb(j)+1}\cdot\sum_{i=lb(j)}^{hb(j)}C(i)\right]\right),$$

where hb(j) and lb(j) denote a high frequency boundary and a low frequency boundary of the $j^{th}$ subband in a frequency spectrum of the input audio frame respectively, and C (i) denotes the frequency spectrum of the input audio frame.

The long-time moving average mov_log_max_spl of the time domain maximum logarithmic sampling point amplitude of the current audio frame is only updated in an active voice frame:

$$mov\_\text{log\_max\_}spl = \begin{cases} 0.95\cdot mov\_\text{log\_max\_}spl_{-1} + 0.05\cdot \text{log\_max\_}spl & \text{log\_max\_}spl > mov\_\text{log\_max\_}spl_{-1} \\ 0.995\cdot mov\_\text{log\_max\_}spl_{-1} + 0.005\cdot \text{log\_max\_}spl & \text{log\_max\_}spl \le mov\_\text{log\_max\_}spl_{-1} \end{cases}.$$

In an embodiment, the frequency spectrum fluctuation flux of the current audio frame is buffered in a FIFO flux historical buffer. In this embodiment, the length of the flux historical buffer is 60 (60 frames). The voice activity of the current audio frame and whether the audio frame is an energy attack are determined, and when the current audio frame is a foreground signal frame and none of the current audio frame and two frames before the current audio frame belongs to an energy attack of music, the frequency spectrum fluctuation flux of the current audio frame is stored in the memory.

Before flux of the current audio frame is buffered, it is checked whether the following conditions are satisfied:

$$\begin{cases} vad\_\text{flag} \ne 0 \\ \text{attack\_flag} \ne 1 \\ \text{attack\_flag}_{-1} \ne 1 \\ \text{attack\_flag}_{-2} \ne 1 \end{cases},$$

if the conditions are satisfied, flux is buffered. Otherwise, flux is not buffered.

vad_flag denotes whether the current input signal is an active foreground signal or a silent background signal of a foreground signal, and vad_flag=0 denotes a background signal frame, and attack_flag denotes whether the current audio frame belongs to an energy attack in music, and attack_flag=1 denotes that the current audio frame is an energy attack in a piece of music.

The meaning of the foregoing formula is, the current audio frame is an active frame, and none of the current audio frame, the previous audio frame, and the previous second audio frame belongs to an energy attack.

Step 102: Update, according to whether the audio frame is percussive music or activity of a historical audio frame, frequency spectrum fluctuations stored in the frequency spectrum fluctuation memory.

In an embodiment, if a parameter denoting whether the audio frame belongs to percussive music denotes that the current audio frame belongs to percussive music, values of the frequency spectrum fluctuations stored in the frequency spectrum fluctuation memory are modified, and valid frequency spectrum fluctuation values in the frequency spectrum fluctuation memory are modified into a value less than or equal to a music threshold, where when a frequency spectrum fluctuation of an audio frame is less than the music threshold, the audio frame is classified as a music frame. In an embodiment, the valid frequency spectrum fluctuation values are reset to 5. That is, when a percussive sound flag (percus_flag) is set to 1, all valid buffer data in the flux historical buffer is reset to 5. Herein, the valid buffer data is equivalent to a valid frequency spectrum fluctuation value. Generally, a frequency spectrum fluctuation value of a music frame is relatively small, while a frequency spectrum fluctuation value of a speech frame is relatively large. When the audio frame belongs to percussive music, the valid frequency spectrum fluctuation values are modified into a value less than or equal to the music threshold, which can improve a probability that the audio frame is classified as a music frame, thereby improving accuracy of audio signal classification.

In another embodiment, the frequency spectrum fluctuations in the memory are updated according to activity of a historical frame of the current audio frame. Furthermore, in an embodiment, if the frequency spectrum fluctuation of the current audio frame is stored in the frequency spectrum fluctuation memory, and a previous audio frame is an inactive frame, data of other frequency spectrum fluctuations stored in the frequency spectrum fluctuation memory except the frequency spectrum fluctuation of the current audio frame is modified into ineffective data. When the previous audio frame is an inactive frame while the current audio frame is an active frame, the voice activity of the current audio frame is different from that of the historical frame, a frequency spectrum fluctuation of the historical frame is invalidated, which can reduce an impact of the historical frame on audio classification, thereby improving accuracy of audio signal classification.

In another embodiment, if the frequency spectrum fluctuation of the current audio frame is stored in the frequency spectrum fluctuation memory, and three consecutive frames before the current audio frame are not all active frames, the frequency spectrum fluctuation of the current audio frame is modified into a first value. The first value may be a speech threshold, where when the frequency spectrum fluctuation of the audio frame is greater than the speech threshold, the audio frame is classified as a speech frame. In another embodiment, if the frequency spectrum fluctuation of the current audio frame is stored in the frequency spectrum fluctuation memory, and a classification result of a historical frame is a music frame and the frequency spectrum fluctuation of the current audio frame is greater than a second value, the frequency spectrum fluctuation of the current audio frame is modified into the second value, where the second value is greater than the first value.

If flux of the current audio frame is buffered, and the previous audio frame is an inactive frame (vad_flag=0), except the current audio frame flux newly buffered in the flux historical buffer, the remaining data in the flux historical buffer is all reset to −1 (equivalent to that the data is invalidated).

If flux is buffered in the flux historical buffer, and three consecutive frames before the current audio frame are not all active frames (vad_flag=1), the current audio frame flux just buffered in the flux historical buffer is modified into 16. That is, it is checked whether the following conditions are satisfied:

$$\begin{cases} vad\_\text{flag}_{-1} = 1 \\ vad\_\text{flag}_{-2} = 1, \\ vad\_\text{flag}_{-3} = 1 \end{cases}$$

if the conditions are not satisfied, the current audio frame flux just buffered in the flux historical buffer is modified into 16, and if the three consecutive frames before the current audio frame are all active frames (vad_flag=1), it is checked whether the following conditions are satisfied:

$$\begin{cases} \text{mod}\, e\_mov > 0.9 \\ \text{flux} > 20 \end{cases},$$

if the conditions are satisfied, the current audio frame flux just buffered in the flux historical buffer is modified into 20. Otherwise, no operation is performed, where mode_mov denotes a long-time moving average of historical final classification results in signal classification. mode_mov>0.9 denotes that the signal is in a music signal, and flux is limited according to the historical classification result of the audio signal, to reduce a probability that a speech characteristic occurs in flux and improve stability of determining classification.

When the three consecutive historical frames before the current audio frame are all inactive frames, and the current audio frame is an active frame, or when the three consecutive frames before the current audio frame are not all active frames, and the current audio frame is an active frame, classification is in an initialization phase. In an embodiment, to make the classification result prone to speech (music), the frequency spectrum fluctuation of the current audio frame may be modified into a speech (music) threshold or a value close to the speech (music) threshold. In another embodiment, if a signal before a current signal is a speech (music) signal, the frequency spectrum fluctuation of the current audio frame may be modified into a speech (music) threshold or a value close to the speech (music) threshold, to improve stability of determining classification. In another embodiment, to make the classification result prone to music, the frequency spectrum fluctuation may be limited, that is, the frequency spectrum fluctuation of the current audio frame may be modified, such that the frequency spectrum fluctuation is not greater than a threshold, to reduce a probability of determining that the frequency spectrum fluctuation is a speech characteristic.

The percus_flag denotes whether a percussive sound exists in an audio frame. That percus_flag is set to 1 denotes that a percussive sound is detected, and that percus_flag is set to 0 denotes that no percussive sound is detected.

When a relatively acute energy protrusion occurs in the current signal (that is, several latest signal frames including the current audio frame and several historical frames of the current audio frame) in both a short time and a long time, and the current signal has no obvious voiced sound characteristic, if the several historical frames before the current audio frame are mainly music frames, it is considered that the current signal is a piece of percussive music, otherwise, further, if none of subframes of the current signal has an obvious voiced sound characteristic and a relatively obvious increase also occurs in the time domain envelope of the current signal relative to a long-time average of the time domain envelope, it is also considered that the current signal is a piece of percussive music.

The percus_flag is obtained by performing the following step.

Logarithmic frame energy of an input audio frame is first obtained, where the etot is denoted by logarithmic total subband energy of the input audio frame:

$$etot = 10\log\left(\sum_{j=0}^{19}\left[\frac{1}{hb(j) - lb(j) + 1}\cdot\sum_{i-lb(j)}^{hb(j)} C(i)\right]\right),$$

where hb(j) and lb(j) denote a high frequency boundary and a low frequency boundary of the $j^{th}$ subband in a frequency spectrum of the input frame respectively, and C (i) denotes the frequency spectrum of the input audio frame.

When the following conditions are satisfied, percus_flag is set to 1. Otherwise, percus_flag is set to 0:

$$\begin{cases} etot_{-2} - etot_{-3} > 6 \\ etot_{-2} - etot_{-1} > 0 \\ etot_{-2} - etot > 3 \\ etot_{-1} - etot > 0 \\ etot_{-2} - lp\_\text{speech} > 3 \\ 0.5 \cdot \text{voicing}_{-1}(1) + 0.25 \cdot \text{voicing}(0) + 0.25 \cdot \text{voicing}(1) < 0.75 \\ \text{mode}\_mov > 0.9 \end{cases},$$

or $$\begin{cases} etot_{-2} - etot_{-3} > 6 \\ etot_{-2} - etot_{-1} > 0 \\ etot_{-2} - etot > 3 \\ etot_{-1} - etot > 0 \\ etot_{-2} - lp\_\text{speech} > 3 \\ 0.5 \cdot \text{voicing}_{-1}(1) + 0.25 \cdot \text{voicing}(0) + 0.25 \cdot \text{voicing}(1) < 0.75 \\ \text{voicing}_{-1}(0) < 0.8 \\ \text{voicing}_{-1}(1) < 0.8 \\ \text{voicing}(0) < 0.8 \\ \text{log\_max\_}spl_{-2} - mov\text{\_log\_max\_}spl_{-2} > 10 \end{cases},$$

where etot denotes logarithmic frame energy of the current audio frame, lp_speech denotes a long-time moving average of the logarithmic frame energy etot, voicing(0), voicing_i (0), and $\text{voicing}_{-1}(1)$ denote normalized open-loop pitch correlation degrees of a first subframe of a current input audio frame and first and second subframes of a first historical frame respectively, and a voicing parameter voicing is obtained by means of linear prediction and analysis, represents a time domain correlation degree between the current audio frame and a signal before a pitch period, and has a value between 0 and 1, mode_mov denotes a long-time moving average of historical final classification results in signal classification, $\text{log\_max\_spl}_{-2}$ and $\text{mov\_log\_max\_spl}_{-2}$ denote a time domain maximum logarithmic sampling point amplitude of a second historical frame and a long-time moving average of the time domain maximum logarithmic sampling point amplitude respectively. lp_speech is updated in each active voice frame (that is, a frame whose vad_flag=1), and a method for updating lp_speech is:

$$lp\_\text{speech}=0.99 \cdot lp\_\text{speech}_{1}+0.01 \cdot \text{etot}.$$

The meaning of the foregoing two formulas is, when a relatively acute energy protrusion occurs in the current signal (that is, several latest signal frames including the current audio frame and several historical frames of the current audio frame) in both a short time and a long time, and the current signal has no obvious voiced sound characteristic, if the several historical frames before the current audio frame are mainly music frames, it is considered that the current signal is a piece of percussive music. Otherwise, further, if none of subframes of the current signal has an obvious voiced sound characteristic and a relatively obvious increase also occurs in the time domain envelope of the current signal relative to a long-time average thereof, it is also considered that the current signal is a piece of percussive music.

The voicing parameter voicing, that is, a normalized open-loop pitch correlation degree, denotes a time domain correlation degree between the current audio frame and a signal before a pitch period, may be obtained by means of algebraic code-excited linear prediction (ACELP) open-loop pitch search, and has a value between 0 and 1. This is not described in detail in the present disclosure. In this embodiment, a voicing is calculated for each of two subframes of the current audio frame, and the voicings are averaged to obtain a voicing parameter of the current audio frame. The voicing parameter of the current audio frame is also buffered in a voicing historical buffer, and in this embodiment, the length of the voicing historical buffer is 10.

mode_mov is updated in each active voice frame and when more than 30 consecutive active voice frames have occurred before the frame, and an updating method is:

$$\text{mode\_mov}=0.95 \cdot \text{move\_mov}_{-1}+0.05 \cdot \text{mode},$$

where mode is a classification result of a current input audio frame, and has a binary value, where "0" denotes a speech category, and "1" denotes a music category.

Step 103: Classify the current audio frame as a speech frame or a music frame according to statistics of a part or all of data of the multiple frequency spectrum fluctuations stored in the frequency spectrum fluctuation memory. When statistics of effective data of the frequency spectrum fluctuations satisfy a speech classification condition, the current audio frame is classified as a speech frame. When the statistics of the effective data of the frequency spectrum fluctuations satisfy a music classification condition, the current audio frame is classified as a music frame.

The statistics herein is a value obtained by performing a statistical operation on a valid frequency spectrum fluctuation (that is, effective data) stored in the frequency spectrum fluctuation memory. For example, the statistical operation may be an operation for obtaining average value or a variance. Statistics in the following embodiments have similar meaning.

In an embodiment, step 103 includes obtaining an average value of a part or all of the effective data of the frequency spectrum fluctuations stored in the frequency spectrum fluctuation memory, and when the obtained average value of the effective data of the frequency spectrum fluctuations satisfies a music classification condition, classifying the current audio frame as a music frame. Otherwise, classifying the current audio frame as a speech frame.

For example, when the obtained average value of the effective data of the frequency spectrum fluctuations is less than a music classification threshold, the current audio frame is classified as a music frame. Otherwise, the current audio frame is classified as a speech frame.

Generally, a frequency spectrum fluctuation value of a music frame is relatively small, while a frequency spectrum fluctuation value of a speech frame is relatively large. Therefore, the current audio frame may be classified according to the frequency spectrum fluctuations. Certainly, signal classification may also be performed on the current audio frame using another classification method. For example, a quantity of pieces of effective data of the frequency spectrum fluctuations stored in the frequency spectrum fluctuation memory is counted. The frequency spectrum fluctuation memory is divided, according to the quantity of the pieces of effective data, into at least two intervals of different lengths from a near end to a remote end, and an average value of effective data of frequency spectrum fluctuations corresponding to each interval is obtained, where a start point of the intervals is a storage location of the frequency spectrum fluctuation of the current frame, the near end is an end at which the frequency spectrum fluctuation of the current frame is stored, and the remote end is an end at which a frequency spectrum fluctuation of a historical frame is stored. The audio frame is classified according to statistics of frequency spectrum fluctuations in a relatively short interval, and if the statistics of the parameters in this interval are sufficient to distinguish a type of the audio frame, the classification process ends. Otherwise, the classification process is continued in the shortest interval of the remaining relatively long intervals, and the rest can be deduced by analogy. In a classification process of each interval, the current audio frame is classified according to a classification threshold corresponding to each interval, the current audio frame is classified as a speech frame or a music frame, and when the statistics of the effective data of the frequency spectrum fluctuations satisfy the speech classification condition, the current audio frame is classified as a speech frame. When the statistics of the effective data of the frequency spectrum fluctuations satisfy the music classification condition, the current audio frame is classified as a music frame.

After signal classification, different signals may be encoded in different encoding modes. For example, a speech signal is encoded using an encoder based on a speech generating model (such as CELP), and a music signal is encoded using an encoder based on conversion (such as an encoder based on MDCT).

In the foregoing embodiment, because an audio signal is classified according to long-time statistics of frequency spectrum fluctuations, there are relatively few parameters, a recognition rate is relatively high, and complexity is relatively low. In addition, the frequency spectrum fluctuations are adjusted with consideration of factors such as voice activity and percussive music. Therefore, the present disclosure has a higher recognition rate for a music signal, and is suitable for hybrid audio signal classification.

Figure 4:
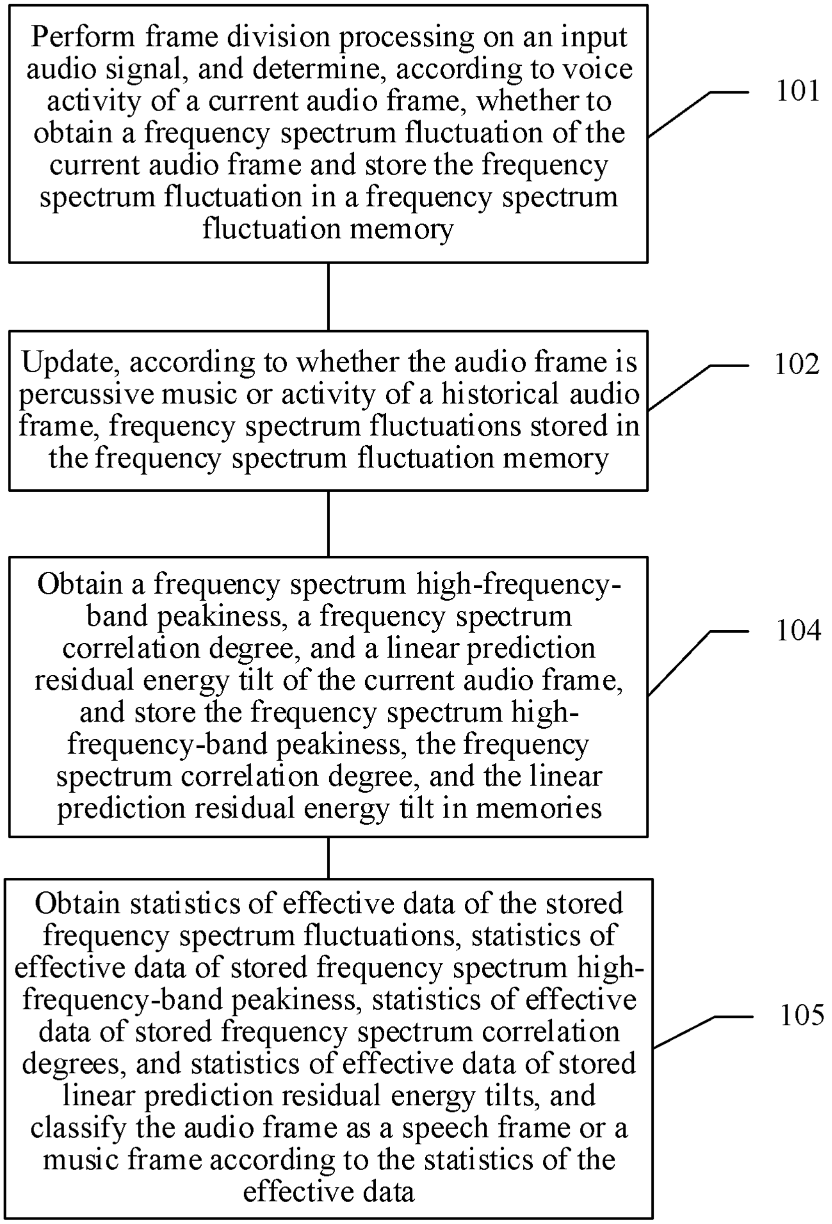
FIG. 4 is a schematic flowchart of another embodiment of an audio signal classification method according to the present disclosure.

Referring to FIG. 4, in another embodiment, after step 102, the method further includes the following steps.

Step 104: Obtain a frequency spectrum high-frequency-band peakiness, a frequency spectrum correlation degree, and a linear prediction residual energy tilt of the current audio frame, and store the frequency spectrum high-frequency-band peakiness, the frequency spectrum correlation degree, and the linear prediction residual energy tilt in memories, where the frequency spectrum high-frequency-band peakiness denotes a peakiness or an energy acutance, on a high frequency band, of a frequency spectrum of the current audio frame. The frequency spectrum correlation degree denotes stability, between adjacent frames, of a signal harmonic structure, and the linear prediction residual energy tilt denotes the linear prediction residual energy tilt denotes an extent to which linear prediction residual energy of the input audio signal changes as a linear prediction order increases.

Optionally, before these parameters are stored, the method further includes determining, according to the voice activity of the current audio frame, whether to store the frequency spectrum high-frequency-band peakiness, the frequency spectrum correlation degree, and the linear prediction residual energy tilt in the memories, and if the current audio frame is an active frame, storing the parameters. Otherwise, skipping storing the parameters.

The frequency spectrum high-frequency-band peakiness denotes a peakiness or an energy acutance, on a high frequency band, of a frequency spectrum of the current audio frame. In an embodiment, the frequency spectrum high-frequency-band peakiness (ph) is calculated using the following formula:

$$ph=\Sigma_{i=64}^{126} p2v\_map(i),$$

where p2v_map(i) denotes a peakiness of the $i^{th}$ frequency bin of a frequency spectrum, and the peakiness p2v_map(i) is obtained using the following formula:

$$p2v\_\text{map}(i) = \begin{cases} 20\log(\text{peak}(i)) - 10\log(vl(i)) - 10\log(vr(i)) & \text{peak}(i) \neq 0 \\ 0 & \text{peak}(i) = 0 \end{cases},$$

where peak(i)=C(i) if the $i^{th}$ frequency bin is a local peak value of the frequency spectrum. Otherwise, peak(i)=0, and vl(i) and vr(i) denote local frequency spectrum valley values (v(n)) that are most adjacent to the $i^{th}$ frequency bin on a high-frequency side and a low-frequency side of the $i^{th}$ frequency bin respectively, where $$\text{peak}(i) = \begin{cases} C(i) & C(i) > C(i-1), C(i) > C(i+1) \\ 0 & \text{else} \end{cases},$$

and $$v = \forall C(i) \quad C(i) < C(i-1), C(i) < C(i+1).$$

The ph of the current audio frame is also buffered in a ph historical buffer, and in this embodiment, the length of the ph historical buffer is 60.

The frequency spectrum correlation degree (cor_map_sum) denotes stability, between adjacent frames, of a signal harmonic structure, and is obtained by performing the following steps.

First, a floor-removed frequency spectrum C'(i) of an input audio frame C(i) is obtained, where $$C'(i)=C(i)-\text{floor}(i),$$

where floor(i) denotes a spectrum floor of a frequency spectrum of the input audio frame, where i=0, 1, . . . , 127, and $$\text{floor}(i) = \begin{cases} C(i) & C(i) \in v \\ vl(i) + (i - idx[vl(i)]) \cdot \dfrac{vr(i) - vl(i)}{idx[vr(i)] - idx[vl(i)]} & \rightleftarrows \text{else} \end{cases},$$

where idx[x] denotes a location of x on the frequency spectrum, where idx[x]=0, 1, . . . , 127.

Then, between every two adjacent frequency spectrum valley values, a correlation (cor(n)) between the floor-removed frequency spectrum of the input audio frame and a floor-removed frequency spectrum of a previous frame is obtained, where $$cor(n) = \frac{\left(\sum_{i=lb(n)}^{hb(n)} C'(i) \cdot C'_{-1}(i)\right)^2}{\left(\sum_{i=lb(n)}^{hb(n)} C'(i) \cdot C'(i)\right) \cdot \left(\sum_{i=lb(n)}^{hb(n)} C'_{-1}(i) \cdot C'_{-1}(i)\right)},$$

where lb(n) and hb(n) respectively denote endpoint locations of the $n^{th}$ frequency spectrum valley value interval (that is, an area located between two adjacent valley values), that is, locations limiting two frequency spectrum valley values of the valley value interval.

Finally, cor_map_sum of the input audio frame is calculated using the following formula:

$$cor\_map\_sum=\Sigma_{i=0}^{127}cor(inv[lb(n)\le i,hb(n)\ge i]),$$

where inv[f] denotes an inverse function of a function f.

The linear prediction residual energy tilt (epsP_tilt) denotes an extent to which linear prediction residual energy of the input audio signal changes as a linear prediction order increases, and may be calculated and obtained using the following formula:

$$epsP\_tilt = \frac{\sum_{i=1}^{n} epsP(i)\cdot epsP(i+1)}{\sum_{i=1}^{n} epsP(i)\cdot epsP(i)},$$

where epsP(i) denotes prediction residual energy of $i^{th}$-order linear prediction, and n is a positive integer, denotes a linear prediction order, and is less than or equal to a maximum linear prediction order. For example, in an embodiment, n=15.

Therefore, step 103 may be replaced with the following step.

Step 105: Obtain statistics of effective data of the stored frequency spectrum fluctuations, statistics of effective data of stored frequency spectrum high-frequency-band peakiness, statistics of effective data of stored frequency spectrum correlation degrees, and statistics of effective data of stored linear prediction residual energy tilts, and classify the audio frame as a speech frame or a music frame according to the statistics of the effective data, where the statistics of the effective data refer to a data value obtained after a calculation operation is performed on the effective data stored in the memories, where the calculation operation may include an operation for obtaining an average value, an operation for obtaining a variance, or the like.

In an embodiment, this step includes obtaining an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and when one of the following conditions is satisfied, classifying the current audio frame as a music frame. Otherwise, classifying the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

Generally, a frequency spectrum fluctuation value of a music frame is relatively small, while a frequency spectrum fluctuation value of a speech frame is relatively large, a frequency spectrum high-frequency-band peakiness value of a music frame is relatively large, and a frequency spectrum high-frequency-band peakiness of a speech frame is relatively small, a frequency spectrum correlation degree value of a music frame is relatively large, and a frequency spectrum correlation degree value of a speech frame is relatively small, a change in a linear prediction residual energy tilt of a music frame is relatively small, and a change in a linear prediction residual energy tilt of a speech frame is relatively large. Therefore, the current audio frame may be classified according to the statistics of the foregoing parameters. Certainly, signal classification may also be performed on the current audio frame using another classification method. For example, a quantity of pieces of effective data of the frequency spectrum fluctuations stored in the frequency spectrum fluctuation memory is counted. The memory is divided, according to the quantity of the pieces of effective data, into at least two intervals of different lengths from a near end to a remote end, an average value of effective data of frequency spectrum fluctuations corresponding to each interval, an average value of effective data of frequency spectrum high-frequency-band peakiness, an average value of effective data of frequency spectrum correlation degrees, and a variance of effective data of linear prediction residual energy tilts are obtained, where a start point of the intervals is a storage location of the frequency spectrum fluctuation of the current frame, the near end is an end at which the frequency spectrum fluctuation of the current frame is stored, and the remote end is an end at which a frequency spectrum fluctuation of a historical frame is stored. The audio frame is classified according to statistics of effective data of the foregoing parameters in a relatively short interval, and if the statistics of the parameters in this interval are sufficient to distinguish the type of the audio frame, the classification process ends. Otherwise, the classification process is continued in the shortest interval of the remaining relatively long intervals, and the rest can be deduced by analogy. In a classification process of each interval, the current audio frame is classified according to a classification threshold corresponding to each interval, and when one of the following conditions is satisfied, the current audio frame is classified as a music frame. Otherwise, the current audio frame is classified as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

After signal classification, different signals may be encoded in different encoding modes. For example, a speech signal is encoded using an encoder based on a speech generating model (such as CELP), and a music signal is encoded using an encoder based on conversion (such as an encoder based on MDCT).

In the foregoing embodiment, an audio signal is classified according to long-time statistics of frequency spectrum fluctuations, frequency spectrum high-frequency-band peakiness, frequency spectrum correlation degrees, and linear prediction residual energy tilts. Therefore, there are relatively few parameters, a recognition rate is relatively high, and complexity is relatively low. In addition, the frequency spectrum fluctuations are adjusted with consideration of factors such as voice activity and percussive music, and the frequency spectrum fluctuations are modified according to a signal environment in which the current audio frame is located. Therefore, the present disclosure improves a classification recognition rate, and is suitable for hybrid audio signal classification.

Figure 5:
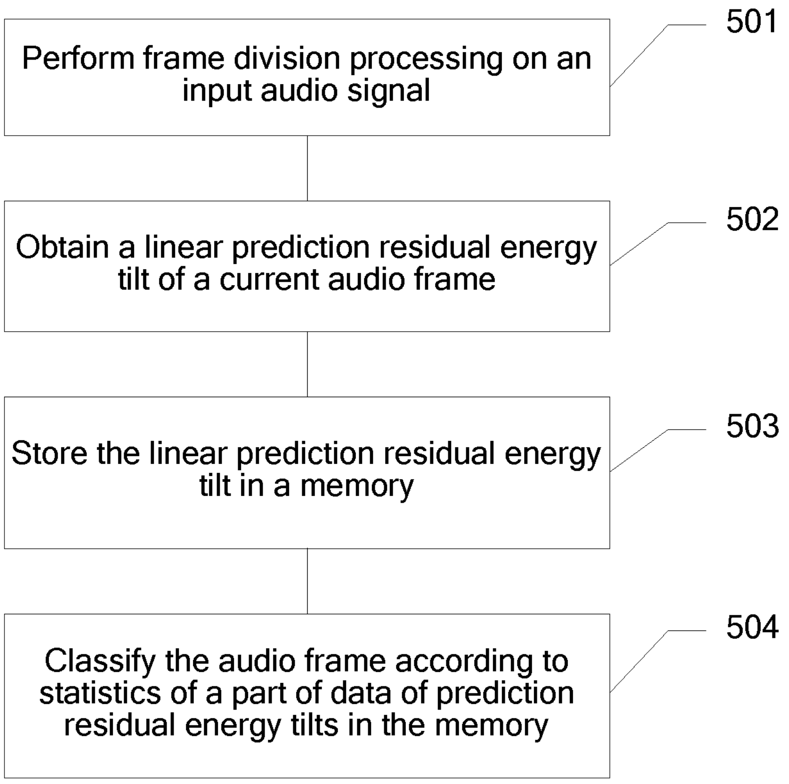
FIG. 5 is a schematic flowchart of another embodiment of an audio signal classification method according to the present disclosure.

Referring to FIG. 5, another embodiment of an audio signal classification method includes the following steps.

Step 501: Perform frame division processing on an input audio signal.

Audio signal classification is generally performed on a per frame basis, and a parameter is extracted from each audio signal frame to perform classification, to determine whether the audio signal frame belongs to a speech frame or a music frame, and perform encoding in a corresponding encoding mode.

Step 502: Obtain a linear prediction residual energy tilt of a current audio frame, where the linear prediction residual energy tilt denotes an extent to which linear prediction residual energy of the audio signal changes as a linear prediction order increases.

In an embodiment, the epsP_tilt may be calculated and obtained using the following formula:

$$epsP\_\text{tilt} = \frac{\sum_{i=1}^{n} epsP(i) \cdot epsP(i+1)}{\sum_{i=1}^{n} epsP(i) \cdot epsP(i)},$$

where epsP(i) denotes prediction residual energy of $i^{th}$-order linear prediction, and n is a positive integer, denotes a linear prediction order, and is less than or equal to a maximum linear prediction order. For example, in an embodiment, n=15.

Step 503: Store the linear prediction residual energy tilt in a memory.

The linear prediction residual energy tilt may be stored in the memory. In an embodiment, the memory may be an FIFO buffer, and the length of the buffer is 60 storage units (that is, 60 linear prediction residual energy tilts can be stored).

Optionally, before the storing the linear prediction residual energy tilt, the method further includes determining, according to voice activity of the current audio frame, whether to store the linear prediction residual energy tilt in the memory, and if the current audio frame is an active frame, storing the linear prediction residual energy tilt. Otherwise, skipping storing the linear prediction residual energy tilt.

Step 504: Classify the audio frame according to statistics of a part of data of prediction residual energy tilts in the memory.

In an embodiment, the statistics of the part of the data of the prediction residual energy tilts is a variance of the part of the data of the prediction residual energy tilts, and therefore step 504 includes comparing the variance of the part of the data of the prediction residual energy tilts with a music classification threshold, and when the variance of the part of the data of the prediction residual energy tilts is less than the music classification threshold, classifying the current audio frame as a music frame. Otherwise, classifying the current audio frame as a speech frame.

Generally, a change in a linear prediction residual energy tilt value of a music frame is relatively small, and a change in a linear prediction residual energy tilt value of a speech frame is relatively large. Therefore, the current audio frame may be classified according to statistics of the linear prediction residual energy tilts. Certainly, signal classification may also be performed on the current audio frame with reference to another parameter using another classification method.

In another embodiment, before step 504, the method further includes obtaining a frequency spectrum fluctuation, a frequency spectrum high-frequency-band peakiness, and a frequency spectrum correlation degree of the current audio frame, and storing the frequency spectrum fluctuation, the frequency spectrum high-frequency-band peakiness, and the frequency spectrum correlation degree in corresponding memories. Therefore, step 504 is further obtaining statistics of effective data of stored frequency spectrum fluctuations, statistics of effective data of stored frequency spectrum high-frequency-band peakiness, statistics of effective data of stored frequency spectrum correlation degrees, and statistics of effective data of the stored linear prediction residual energy tilts, and classifying the audio frame as a speech frame or a music frame according to the statistics of the effective data, where the statistics of the effective data refer to a data value obtained after a calculation operation is performed on the effective data stored in the memories.

Further, the obtaining statistics of effective data of stored frequency spectrum fluctuations, statistics of effective data of stored frequency spectrum high-frequency-band peakiness, statistics of effective data of stored frequency spectrum correlation degrees, and statistics of effective data of the stored linear prediction residual energy tilts, and classifying the audio frame as a speech frame or a music frame according to the statistics of the effective data includes obtaining an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and when one of the following conditions is satisfied, classifying the current audio frame as a music frame. Otherwise, classifying the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

Generally, a frequency spectrum fluctuation value of a music frame is relatively small, while a frequency spectrum fluctuation value of a speech frame is relatively large, a frequency spectrum high-frequency-band peakiness value of a music frame is relatively large, and a frequency spectrum high-frequency-band peakiness of a speech frame is relatively small, a frequency spectrum correlation degree value of a music frame is relatively large, and a frequency spectrum correlation degree value of a speech frame is relatively small, a change in a linear prediction residual energy tilt value of a music frame is relatively small, and a change in a linear prediction residual energy tilt value of a speech frame is relatively large. Therefore, the current audio frame may be classified according to the statistics of the foregoing parameters.

In another embodiment, before step 504, the method further includes obtaining a frequency spectrum tone quantity of the current audio frame and a ratio of the frequency spectrum tone quantity on a low frequency band, and storing the frequency spectrum tone quantity and the ratio of the frequency spectrum tone quantity on the low frequency band in corresponding memories. Therefore, step 504 is further obtaining statistics of the stored linear prediction residual energy tilts and statistics of stored frequency spectrum tone quantities separately, and classifying the audio frame as a speech frame or a music frame according to the statistics of the linear prediction residual energy tilts, the statistics of the frequency spectrum tone quantities, and the ratio of the frequency spectrum tone quantity on the low frequency band, where the statistics refer to a data value obtained after a calculation operation is performed on data stored in the memories.

Further, the obtaining statistics of the stored linear prediction residual energy tilts and statistics of stored frequency spectrum tone quantities separately includes obtaining a variance of the stored linear prediction residual energy tilts, and obtaining an average value of the stored frequency spectrum tone quantities. The classifying the audio frame as a speech frame or a music frame according to the statistics of the linear prediction residual energy tilts, the statistics of the frequency spectrum tone quantities, and the ratio of the frequency spectrum tone quantity on the low frequency band includes, when the current audio frame is an active frame, and one of the following conditions is satisfied, classifying the current audio frame as a music frame. Otherwise, classifying the current audio frame as a speech frame. The variance of the linear prediction residual energy tilts is less than a fifth threshold, or the average value of the frequency spectrum tone quantities is greater than a sixth threshold, or the ratio of the frequency spectrum tone quantity on the low frequency band is less than a seventh threshold.

The obtaining a frequency spectrum tone quantity of the current audio frame and a ratio of the frequency spectrum tone quantity on a low frequency band includes counting a quantity of frequency bins of the current audio frame that are on a frequency band from 0 to 8 kHz and have frequency bin peak values greater than a predetermined value, to use the quantity as the frequency spectrum tone quantity, and calculating a ratio of a quantity of frequency bins of the current audio frame that are on a frequency band from 0 to 4 kHz and have frequency bin peak values greater than the predetermined value to the quantity of the frequency bins of the current audio frame that are on the frequency band from 0 to 8 kHz and have frequency bin peak values greater than the predetermined value, to use the ratio as the ratio of the frequency spectrum tone quantity on the low frequency band. In an embodiment, the predetermined value is 50.

The frequency spectrum tone quantity (Ntonal) denotes a quantity of frequency bins of the current audio frame that are on a frequency band from 0 to 8 kHz and have frequency bin peak values greater than a predetermined value. In an embodiment, the quantity may be obtained in the following manner: counting a quantity of frequency bins of the current audio frame that are on a frequency band from 0 to 8 kHz and have peakiness p2v_map(i) greater than 50, that is, Ntonal, where p2v_map(i) denotes a peakiness of the $i^{th}$ frequency bin of the frequency spectrum, and for a calculating manner of p2v_map(i), refer to description of the foregoing embodiment.

The ratio (ratio_Ntonal_lf) of the frequency spectrum tone quantity on the low frequency band denotes a ratio of a low-frequency-band tone quantity to the frequency spectrum tone quantity. In an embodiment, the ratio may be obtained in the following manner: counting a quantity Ntonal_lf of frequency bins of the current audio frame that are on a frequency band from 0 to 4 kHz and have p2v_map (i) greater than 50. ratio_Ntonal_lf is a ratio of Ntonal_lf to Ntonal, that is, Ntonal_lf/Ntonal. p2v_map(i) denotes a peakiness of the $i^{th}$ frequency bin of the frequency spectrum, and for a calculating manner of p2v_map(i), refer to description of the foregoing embodiment. In another embodiment, an average of multiple stored Ntonal values and an average of multiple stored Ntonal_lf values are separately obtained, and a ratio of the average of the Ntonal_lf values to the average of the Ntonal values is calculated to be used as the ratio of the frequency spectrum tone quantity on the low frequency band.

In this embodiment, an audio signal is classified according to long-time statistics of linear prediction residual energy tilts. In addition, both classification robustness and a classification recognition speed are taken into account. Therefore, there are relatively few classification parameters, but a result is relatively accurate, complexity is low, and memory overheads are low.

Figure 6:
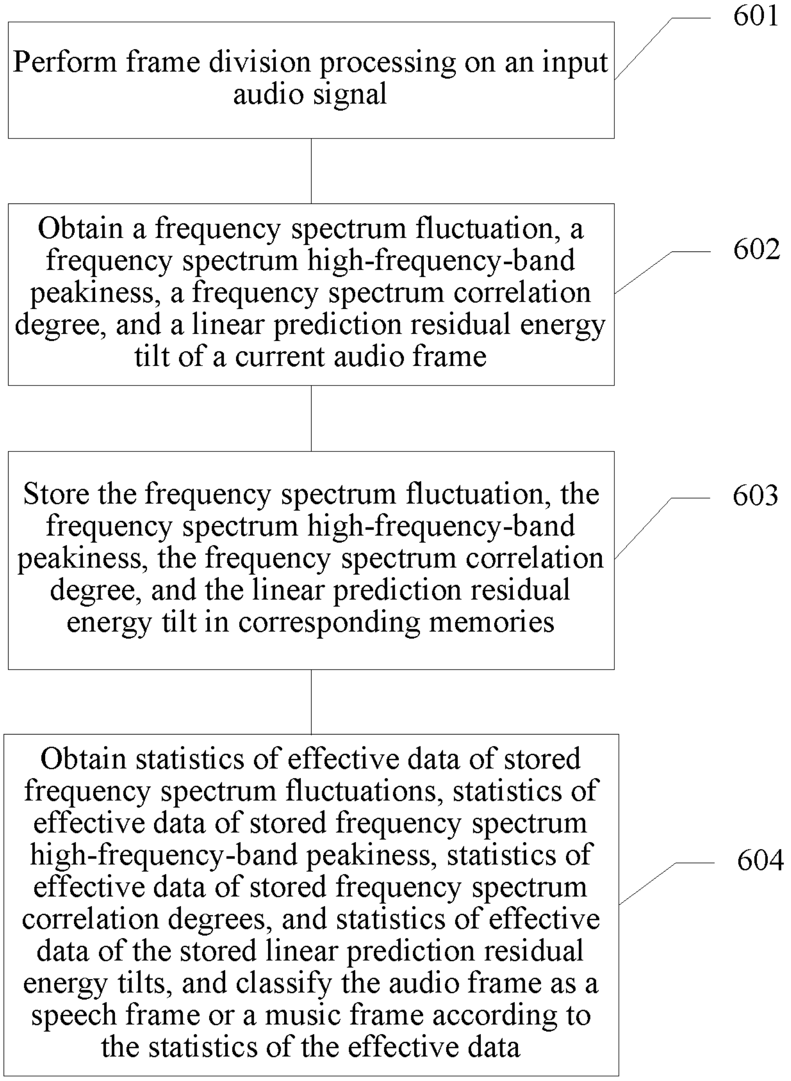
FIG. 6 is a schematic flowchart of another embodiment of an audio signal classification method according to the present disclosure.

Referring to FIG. 6, another embodiment of an audio signal classification method includes the following steps.

Step 601: Perform frame division processing on an input audio signal.

Step 602: Obtain a frequency spectrum fluctuation, a frequency spectrum high-frequency-band peakiness, a frequency spectrum correlation degree, and a linear prediction residual energy tilt of a current audio frame.

The frequency spectrum fluctuation flux denotes a short-time or long-time energy fluctuation of a frequency spectrum of a signal, and is an average value of absolute values of logarithmic energy differences between corresponding frequencies of a current audio frame and a historical frame on a low and mid-band spectrum, where the historical frame refers to any frame before the current audio frame. The ph denotes a peakiness or an energy acutance, on a high frequency band, of a frequency spectrum of the current audio frame. The cor_map_sum denotes stability, between adjacent frames, of a signal harmonic structure. The epsP_tilt denotes an extent to which linear prediction residual energy of the input audio signal changes as a linear prediction order increases. For a specific method for calculating these parameters, refer to the foregoing embodiment.

Further, a voicing parameter may be obtained and the voicing parameter voicing denotes a time domain correlation degree between the current audio frame and a signal before a pitch period. The voicing parameter (voicing) is obtained by means of linear prediction and analysis, represents a time domain correlation degree between the current audio frame and a signal before a pitch period, and has a value between 0 and 1. This is not described in detail in the present disclosure. In this embodiment, a voicing is calculated for each of two subframes of the current audio frame, and the voicings are averaged to obtain a voicing parameter of the current audio frame. The voicing parameter of the current audio frame is also buffered in a voicing historical buffer, and in this embodiment, the length of the voicing historical buffer is 10.

Step 603: Store the frequency spectrum fluctuation, the frequency spectrum high-frequency-band peakiness, the frequency spectrum correlation degree, and the linear prediction residual energy tilt in corresponding memories.

Optionally, before these parameters are stored, the method further includes the following.

In an embodiment, it is determined according to the voice activity of the current audio frame whether to store the frequency spectrum fluctuation in the frequency spectrum fluctuation memory. If the current audio frame is an active frame, the frequency spectrum fluctuation of the current audio frame is stored in the frequency spectrum fluctuation memory.

In another embodiment, it is determined, according to the voice activity of the audio frame and whether the audio frame is an energy attack, whether to store the frequency spectrum fluctuation in the memory. If the current audio frame is an active frame, and the current audio frame does not belong to an energy attack, the frequency spectrum fluctuation of the current audio frame is stored in the frequency spectrum fluctuation memory. In another embodiment, if the current audio frame is an active frame, and none of multiple consecutive frames including the current audio frame and a historical frame of the current audio frame belongs to an energy attack, the frequency spectrum fluctuation of the audio frame is stored in the frequency spectrum fluctuation memory. Otherwise, the frequency spectrum fluctuation is not stored. For example, if the current audio frame is an active frame, and neither a previous frame of the current audio frame nor a second historical frame of the current audio frame belongs to an energy attack, the frequency spectrum fluctuation of the audio frame is stored in the frequency spectrum fluctuation memory. Otherwise, the frequency spectrum fluctuation is not stored.

For definitions and obtaining manners of the vad_flag and the attack_flag, refer to description of the foregoing embodiment.

Optionally, before these parameters are stored, the method further includes determining, according to the voice activity of the current audio frame, whether to store the frequency spectrum high-frequency-band peakiness, the frequency spectrum correlation degree, and the linear prediction residual energy tilt in the memories, and if the current audio frame is an active frame, storing the parameters. Otherwise, skipping storing the parameters.

Step 604: Obtain statistics of effective data of stored frequency spectrum fluctuations, statistics of effective data of stored frequency spectrum high-frequency-band peakiness, statistics of effective data of stored frequency spectrum correlation degrees, and statistics of effective data of stored linear prediction residual energy tilts, and classify the audio frame as a speech frame or a music frame according to the statistics of the effective data, where the statistics of the effective data refer to a data value obtained after a calculation operation is performed on the effective data stored in the memories, where the calculation operation may include an operation for obtaining an average value, an operation for obtaining a variance, or the like.

Optionally, before step 604, the method may further include updating, according to whether the current audio frame is percussive music, the frequency spectrum fluctuations stored in the frequency spectrum fluctuation memory. In an embodiment, if the current audio frame is percussive music, valid frequency spectrum fluctuation values in the frequency spectrum fluctuation memory are modified into a value less than or equal to a music threshold, where when a frequency spectrum fluctuation of an audio frame is less than the music threshold, the audio frame is classified as a music frame. In an embodiment, if the current audio frame is percussive music, valid frequency spectrum fluctuation values in the frequency spectrum fluctuation memory are reset to 5.

Optionally, before step 604, the method may further include updating the frequency spectrum fluctuations in the memory according to activity of a historical frame of the current audio frame. In an embodiment, if the frequency spectrum fluctuation of the current audio frame is stored in the frequency spectrum fluctuation memory, and a previous audio frame is an inactive frame, data of other frequency spectrum fluctuations stored in the frequency spectrum fluctuation memory except the frequency spectrum fluctuation of the current audio frame is modified into in effective data. In another embodiment, if the frequency spectrum fluctuation of the current audio frame is stored in the frequency spectrum fluctuation memory, and three consecutive frames before the current audio frame are not all active frames, the frequency spectrum fluctuation of the current audio frame is modified into a first value. The first value may be a speech threshold, where when the frequency spectrum fluctuation of the audio frame is greater than the speech threshold, the audio frame is classified as a speech frame. In another embodiment, if the frequency spectrum fluctuation of the current audio frame is stored in the frequency spectrum fluctuation memory, and a classification result of a historical frame is a music frame and the frequency spectrum fluctuation of the current audio frame is greater than a second value, the frequency spectrum fluctuation of the current audio frame is modified into the second value, where the second value is greater than the first value.

For example, if a previous frame of the current audio frame is an inactive frame (vad_flag=0), except the current audio frame flux newly buffered in the flux historical buffer, the remaining data in the flux historical buffer is all reset to −1 (equivalent to that the data is invalidated). If three consecutive frames before the current audio frame are not all active frames (vad_flag=1), the current audio frame flux just buffered in the flux historical buffer is modified into 16. If the three consecutive frames before the current audio frame are all active frames (vad_flag=1), a long-time smooth result of a historical signal classification result is a music signal and the current audio frame flux is greater than 20, the frequency spectrum fluctuation of the buffered current audio frame is modified into 20. For calculation of the active frame and the long-time smooth result of the historical signal classification result, refer to the foregoing embodiment.

In an embodiment, step 604 includes obtaining an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and when one of the following conditions is satisfied, classifying the current audio frame as a music frame. Otherwise, classifying the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

Generally, a frequency spectrum fluctuation value of a music frame is relatively small, while a frequency spectrum fluctuation value of a speech frame is relatively large, a frequency spectrum high-frequency-band peakiness value of a music frame is relatively large, and a frequency spectrum high-frequency-band peakiness of a speech frame is relatively small, a frequency spectrum correlation degree value of a music frame is relatively large, and a frequency spectrum correlation degree value of a speech frame is relatively small, a linear prediction residual energy tilt value of a music frame is relatively small, and a linear prediction residual energy tilt value of a speech frame is relatively large. Therefore, the current audio frame may be classified according to the statistics of the foregoing parameters. Certainly, signal classification may also be performed on the current audio frame using another classification method. For example, a quantity of pieces of effective data of the frequency spectrum fluctuations stored in the frequency spectrum fluctuation memory is counted. The memory is divided, according to the quantity of the pieces of effective data, into at least two intervals of different lengths from a near end to a remote end, an average value of effective data of frequency spectrum fluctuations corresponding to each interval, an average value of effective data of frequency spectrum high-frequency-band peakiness, an average value of effective data of frequency spectrum correlation degrees, and a variance of effective data of linear prediction residual energy tilts are obtained, where a start point of the intervals is a storage location of the frequency spectrum fluctuation of the current frame, the near end is an end at which the frequency spectrum fluctuation of the current frame is stored, and the remote end is an end at which a frequency spectrum fluctuation of a historical frame is stored. The audio frame is classified according to statistics of the effective data of the foregoing parameters in a relatively short interval, and if parameter statistics in this interval are sufficient to distinguish a type of the audio frame, the classification process ends. Otherwise, the classification process is continued in the shortest interval of the remaining relatively long intervals, and the rest can be deduced by analogy. In a classification process of each interval, the current audio frame is classified according to a classification threshold corresponding to each interval, and when one of the following conditions is satisfied, the current audio frame is classified as a music frame. Otherwise, the current audio frame is classified as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

After signal classification, different signals may be encoded in different encoding modes. For example, a speech signal is encoded using an encoder based on a speech generating model (such as CELP), and a music signal is encoded using an encoder based on conversion (such as an encoder based on MDCT).

In this embodiment, classification is performed according to long-time statistics of frequency spectrum fluctuations, frequency spectrum high-frequency-band peakiness, frequency spectrum correlation degrees, and linear prediction residual energy tilts. In addition, both classification robustness and a classification recognition speed are taken into account. Therefore, there are relatively few classification parameters, but a result is relatively accurate, a recognition rate is relatively high, and complexity is relatively low.

In an embodiment, after the frequency spectrum fluctuation flux, the ph, the cor_map_sum, and the epsP_tilt are stored in the corresponding memories, classification may be performed according to a quantity of pieces of effective data of the stored frequency spectrum fluctuations using different determining processes. If the voice activity flag is set to 1, that is, the current audio frame is an active voice frame, the quantity N of the pieces of effective data of the stored frequency spectrum fluctuations is checked.

If a value of the quantity N of the pieces of effective data of the frequency spectrum fluctuations stored in the memory changes, a determining process also changes.

Figure 7:
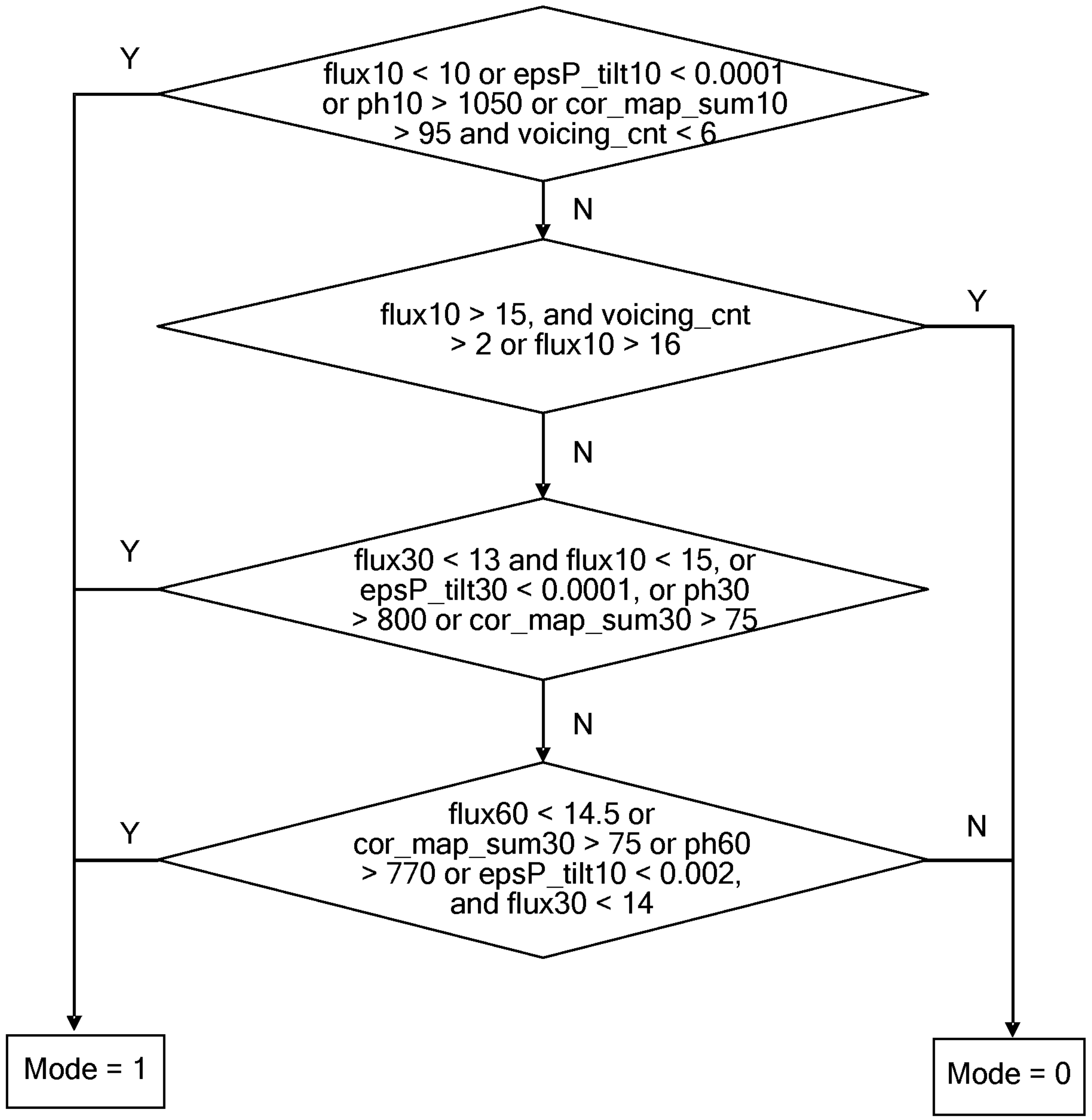
FIG. 7 is a specific classification flowchart of audio signal classification according to the present disclosure.

(1) Referring to FIG. 7, if N=60, an average value of all data in the flux historical buffer is obtained and marked as flux60, an average value of 30 pieces of data at a near end is obtained and marked as flux30, and an average value of 10 pieces of data at the near end is obtained and marked as flux10. An average value of all data in the ph historical buffer is obtained and marked as ph60, an average value of 30 pieces of data at a near end is obtained and marked as ph30, and an average value of 10 pieces of data at the near end is obtained and marked as ph10. An average value of all data in the cor_map_sum historical buffer is obtained and marked as cor_map_sum60, an average value of 30 pieces of data at a near end is obtained and marked as cor_map_sum30, and an average value of 10 pieces of data at the near end is obtained and marked as cor_map_sum10. In addition, a variance of all data in the epsP_tilt historical buffer is obtained and marked as epsP_tilt60, a variance of 30 pieces of data at a near end is obtained and marked as epsP_tilt30, and a variance of 10 pieces of data at the near end is obtained and marked as epsP_tilt10. A quantity voicing_cnt of pieces of data whose value is greater than 0.9 in the voicing historical buffer is obtained. The near end is an end at which the foregoing parameters corresponding to the current audio frame are stored.

First, in step 701, it is checked whether flux10, ph10, epsP_tilt10, cor_map_sum10, and voicing_cnt satisfy the following conditions: flux10<10 or epsPtilt10<0.0001 or ph10>1050 or cor_map_sum10>95, and voicing_cnt<6. If the conditions are satisfied, the current audio frame is classified as a music type (that is, Mode=1). Otherwise, in step 702, it is checked whether flux10 is greater than 15 and whether voicing_cnt is greater than 2, or whether flux10 is greater than 16. If the conditions are satisfied, the current audio frame is classified as a speech type (that is, Mode=0). Otherwise, in step 703, it is checked whether flux30, flux10, ph30, epsP_tilt30, cor_map_sum30, and voicing_cnt satisfy the following conditions: flux30<13 and flux10<15, or epsP-tilt30<0.001 or ph30>800 or cor_map_sum30>75. If the conditions are satisfied, the current audio frame is classified as a music type. Otherwise, in step 704, it is checked whether flux60, flux30, ph60, epsP_tilt60, and cor_map_sum60 satisfy the following conditions: flux60<14.5 or cor_map_sum30>75 or ph60>770 or epsP_tilt10<0.002, and flux30<14. If the conditions are satisfied, the current audio frame is classified as a music type. Otherwise, the current audio frame is classified as a speech type.

Figure 8:
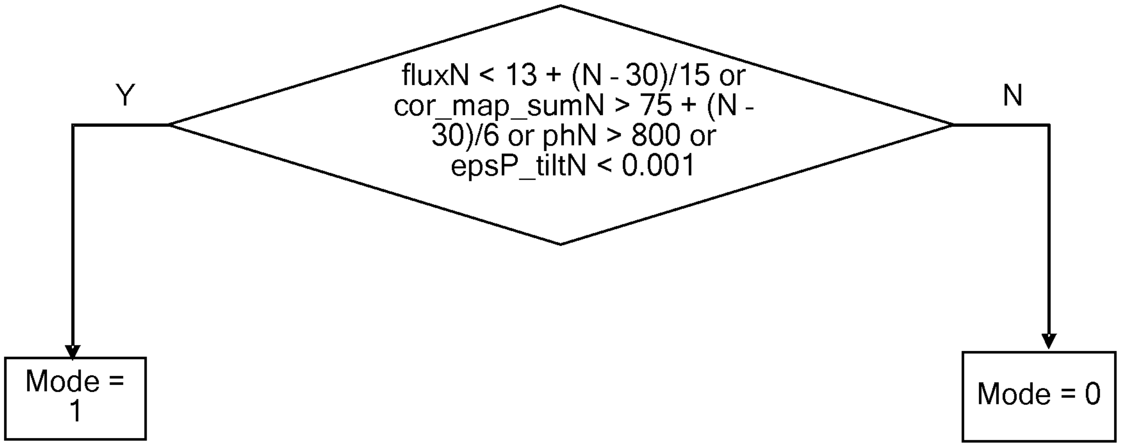
FIG. 8 is another classification flowchart of audio signal classification according to the present disclosure.

(2) Referring to FIG. 8, if N<60 and N≥30, an average value of N pieces of data at a near end in the flux historical buffer, an average value of N pieces of data at a near end in the ph historical buffer, and an average value of N pieces of data at a near end in the cor_map_sum historical buffer are separately obtained and marked as fluxN, phN, and cor_map_sumN. In addition, a variance of N pieces of data at a near end in the epsP_tilt historical buffer is obtained and marked as epsP_tiltN. It is checked, in step 801, whether fluxN, phN, epsP_tiltN, and cor_map_sumN satisfy the following condition: fluxN<13+(N−30)/20 or cor_map_sumN>75+(N−30)/6 or phN>800 or epsP_tiltN<0.001. If the condition is satisfied, the current audio frame is classified as a music type. Otherwise, the current audio frame is classified as a speech type.

Figure 9:
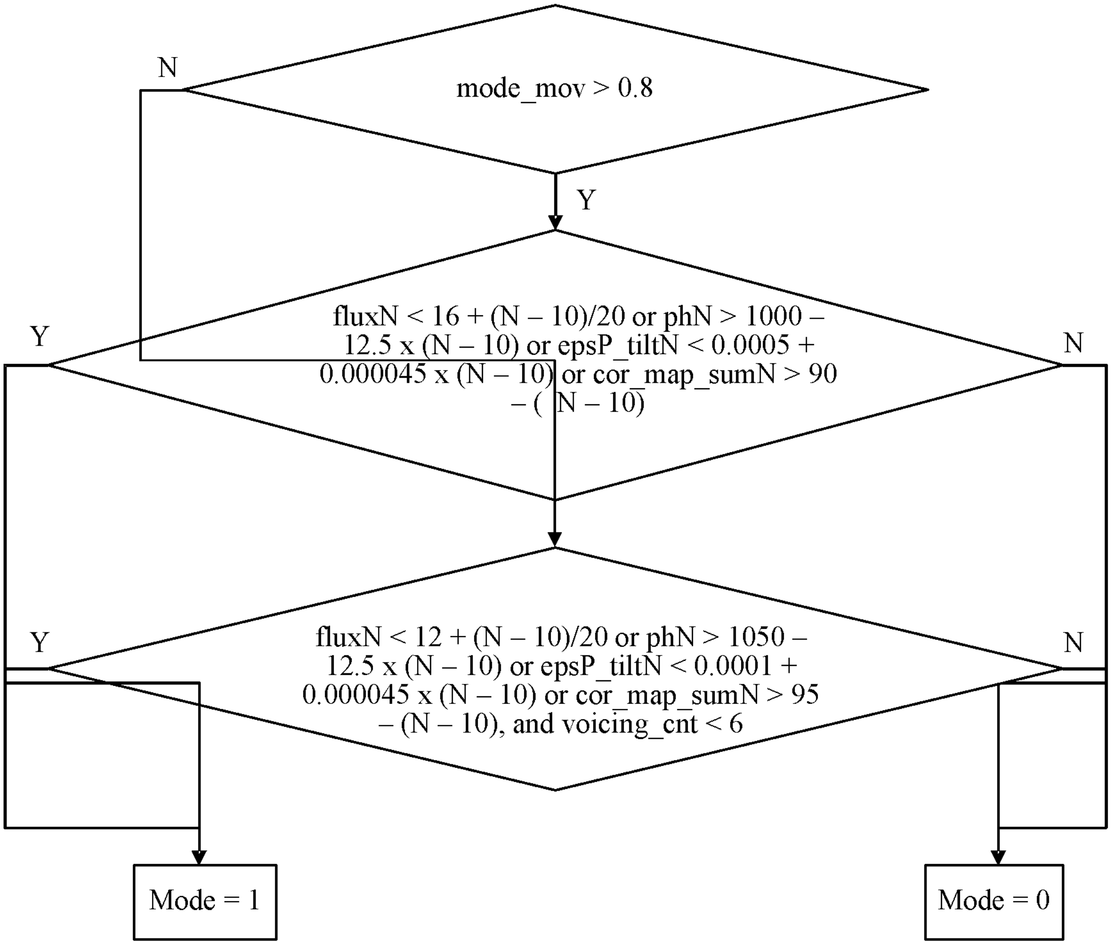
FIG. 9 is another classification flowchart of audio signal classification according to the present disclosure.

(3) Referring to FIG. 9, if N<30 and N≥10, an average value of N pieces of data at a near end in the flux historical buffer, an average value of N pieces of data at a near end in the ph historical buffer, and an average value of N pieces of data at a near end in the cor_map_sum historical buffer are separately obtained and marked as fluxN, phN, and cor_map_sumN. In addition, a variance of N pieces of data at a near end in the epsP_tilt historical buffer is obtained and marked as epsP_tiltN.

First, in step 901, it is checked whether a long-time moving average mode_mov of a historical classification result is greater than 0.8. If yes, in step 902, it is checked whether fluxN, phN, epsP_tiltN, and cor_map_sumN satisfy the following condition: fluxN<16+(N−10)/20 or phN>1000−12.5×(N−10) or epsP_tiltN<0.0005+0.000045×(N−10) or cor_map_sumN>−(N−10). Otherwise, a quantity voicing_cnt of pieces of data whose value is greater than 0.9 in the voicing historical buffer is obtained, and in step 903, it is checked whether the following conditions are satisfied: fluxN<12+(N−10)/20 or phN>1050−12.5×(N−10) or epsP_tiltN<0.0001+0.000045×(N−10) or cor_map_sumN>95−(N−10), and voicing_cnt<6. If any group of the foregoing two groups of conditions is satisfied, the current audio frame is classified as a music type. Otherwise, the current audio frame is classified as a speech type.

Figure 10:
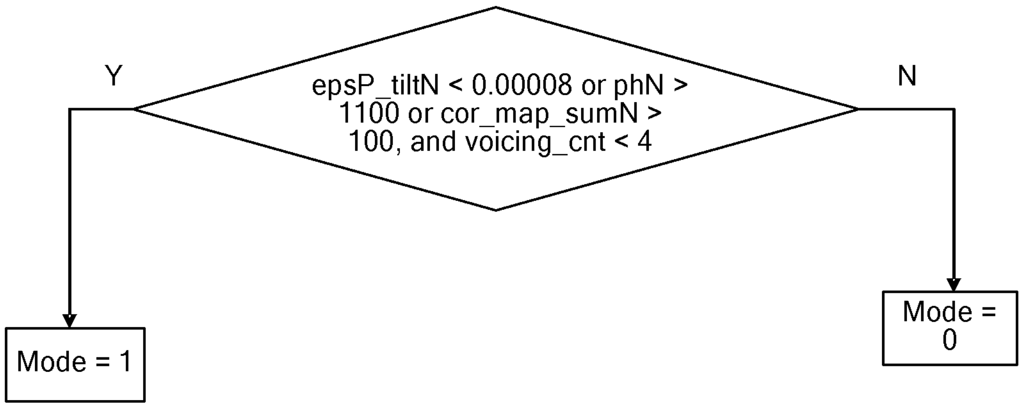
FIG. 10 is another classification flowchart of audio signal classification according to the present disclosure.

(4) Referring to FIG. 10, if N<10 and N>5, an average value of N pieces of data at a near end in the ph historical buffer and an average value of N pieces of data at a near end in the cor_map_sum historical buffer are obtained and marked as phN and cor_map_sumN, and a variance of N pieces of data at a near end in the epsP_tilt historical buffer is obtained and marked as epsP_tiltN. In addition, a quantity voicing_cnt6 of pieces of data whose value is greater than among six pieces of data at a near end in the voicing historical buffer is obtained.

It is checked, in step 1001, whether the following conditions are satisfied: epsP_tiltN<0.00008 or phN>1100 or cor_map_sumN>100, and voicing_cnt<4. If the conditions are satisfied, the current audio frame is classified as a music type. Otherwise, the current audio frame is classified as a speech type.

(5) If N≤5, a classification result of a previous audio frame is used as a classification type of the current audio frame.

The foregoing embodiment is a specific classification process in which classification is performed according to long-time statistics of frequency spectrum fluctuations, frequency spectrum high-frequency-band peakiness, frequency spectrum correlation degrees, and linear prediction residual energy tilts, and a person skilled in the art can understand that, classification may be performed using another process. The classification process in this embodiment may be applied to corresponding steps in the foregoing embodiment, to serve as, for example, a specific classification method of step 103 in FIG. 2, step 105 in FIG. 4, or step 604 in FIG. 6.

Figure 11:
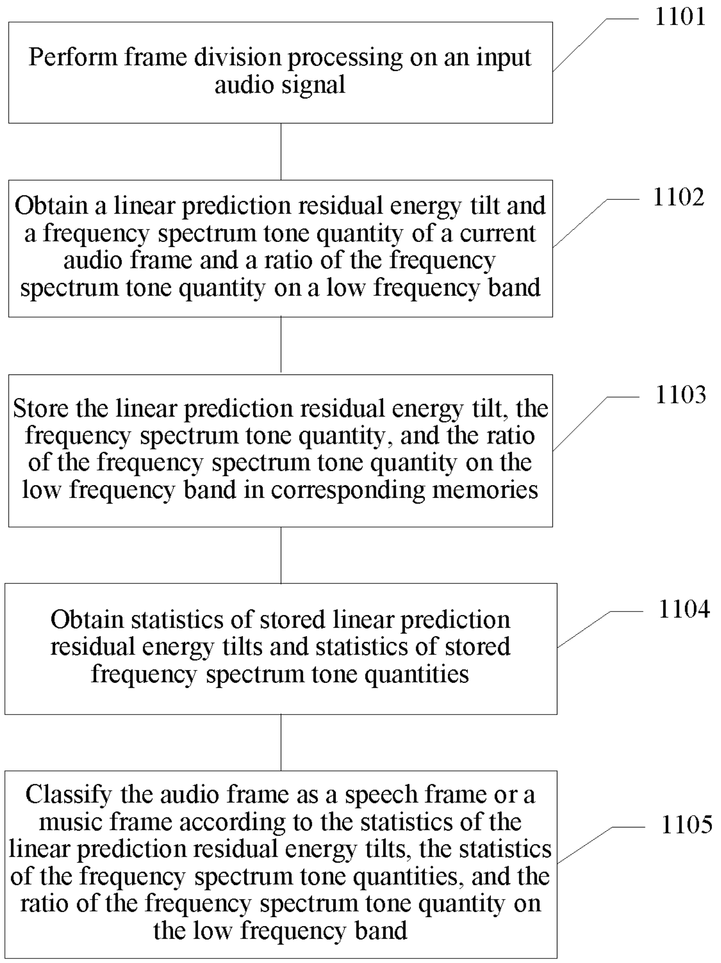
FIG. 11 is a schematic flowchart of another embodiment of an audio signal classification method according to the present disclosure.

Referring to FIG. 11, another embodiment of an audio signal classification method includes the following steps.

Step 1101: Perform frame division processing on an input audio signal.

Step 1102: Obtain a linear prediction residual energy tilt and a frequency spectrum tone quantity of a current audio frame and a ratio of the frequency spectrum tone quantity on a low frequency band.

The epsP_tilt denotes an extent to which linear prediction residual energy of the input audio signal changes as a linear prediction order increases. The Ntonal denotes a quantity of frequency bins of the current audio frame that are on a frequency band from 0 to 8 kHz and have frequency bin peak values greater than a predetermined value. The ratio_Ntonal_lf of the frequency spectrum tone quantity on the low frequency band denotes a ratio of a low-frequency-band tone quantity to the frequency spectrum tone quantity. For specific calculation, refer to description of the foregoing embodiment.

Step 1103: Store the linear prediction residual energy tilt, the frequency spectrum tone quantity, and the ratio of the frequency spectrum tone quantity on the low frequency band in corresponding memories.

The epsP_tilt and the frequency spectrum tone quantity of the current audio frame are buffered in respective historical buffers, and in this embodiment, lengths of the two buffers are also both 60.

Optionally, before these parameters are stored, the method further includes determining, according to voice activity of the current audio frame, whether to store the linear prediction residual energy tilt, the frequency spectrum tone quantity, and the ratio of the frequency spectrum tone quantity on the low frequency band in the memories, and storing the linear prediction residual energy tilt in a memory when the linear prediction residual energy tilt needs to be stored. If the current audio frame is an active frame, the parameters are stored. Otherwise, the parameters are not stored.

Step 1104: Obtain statistics of stored linear prediction residual energy tilts and statistics of stored frequency spectrum tone quantities, where the statistics refer to a data value obtained after a calculation operation is performed on data stored in the memories, where the calculation operation may include an operation for obtaining an average value, an operation for obtaining a variance, or the like.

In an embodiment, the obtaining statistics of stored linear prediction residual energy tilts and statistics of stored frequency spectrum tone quantities separately includes obtaining a variance of the stored linear prediction residual energy tilts, and obtaining an average value of the stored frequency spectrum tone quantities.

Step 1105: Classify the audio frame as a speech frame or a music frame according to the statistics of the linear prediction residual energy tilts, the statistics of the frequency spectrum tone quantities, and the ratio of the frequency spectrum tone quantity on the low frequency band.

In an embodiment, this step includes, when the current audio frame is an active frame, and one of the following conditions is satisfied, classifying the current audio frame as a music frame. Otherwise, classifying the current audio frame as a speech frame. The variance of the linear prediction residual energy tilts is less than a fifth threshold, or the average value of the frequency spectrum tone quantities is greater than a sixth threshold, or the ratio of the frequency spectrum tone quantity on the low frequency band is less than a seventh threshold.

Generally, a linear prediction residual energy tilt value of a music frame is relatively small, and a linear prediction residual energy tilt value of a speech frame is relatively large, a frequency spectrum tone quantity of a music frame is relatively large, and a frequency spectrum tone quantity of a speech frame is relatively small, a ratio of a frequency spectrum tone quantity of a music frame on a low frequency band is relatively low, and a ratio of a frequency spectrum tone quantity of a speech frame on the low frequency band is relatively high (energy of the speech frame is mainly concentrated on the low frequency band). Therefore, the current audio frame may be classified according to the statistics of the foregoing parameters. Certainly, signal classification may also be performed on the current audio frame using another classification method.

After signal classification, different signals may be encoded in different encoding modes. For example, a speech signal is encoded using an encoder based on a speech generating model (such as CELP), and a music signal is encoded using an encoder based on conversion (such as an encoder based on MDCT).

In the foregoing embodiment, an audio signal is classified according to long-time statistics of linear prediction residual energy tilts and frequency spectrum tone quantities and a ratio of a frequency spectrum tone quantity on a low frequency band. Therefore, there are relatively few parameters, a recognition rate is relatively high, and complexity is relatively low.

Figure 12:
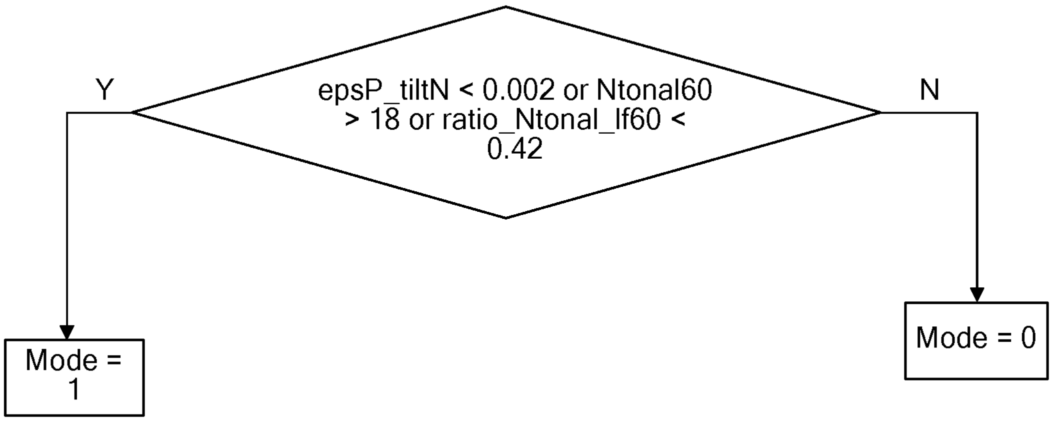
FIG. 12 is a specific classification flowchart of audio signal classification according to the present disclosure.

In an embodiment, after the epsP_tilt, the Ntonal, and the ratio_Ntonal_lf of the frequency spectrum tone quantity on the low frequency band are stored in corresponding buffers, a variance of all data in the epsP_tilt historical buffer is obtained and marked as epsP_tilt60. An average value of all data in the Ntonal historical buffer is obtained and marked as Ntonal60. An average value of all data in the Ntonal_lf historical buffer is obtained, and a ratio of the average value to Ntonal60 is calculated and marked as ratio_Ntonal_lf60. Referring to FIG. 12, a current audio frame is classified according to the following rule.

If a voice activity flag is 1 (that is, vad_flag=1), that is, the current audio frame is an active voice frame, it is checked, in step 1201, whether the following condition is satisfied: epsP_tilt60<0.002 or Ntonal60>18 or ratio_Ntonal_lf60<0.42, if the condition is satisfied, the current audio frame is classified as a music type (that is, Mode=1). Otherwise, the current audio frame is classified as a speech type (that is, Mode=0).

The foregoing embodiment is a specific classification process in which classification is performed according to statistics of linear prediction residual energy tilts, statistics of frequency spectrum tone quantities, and a ratio of a frequency spectrum tone quantity on a low frequency band, and a person skilled in the art can understand that, classification may be performed using another process. The classification process in this embodiment may be applied to corresponding steps in the foregoing embodiment, to serve as, for example, a specific classification method of step 504 in FIG. 5 or step 1105 in FIG. 11.

The present disclosure provides an audio encoding mode selection method having low complexity and low memory overheads. In addition, both classification robustness and a classification recognition speed are taken into account.

Associated with the foregoing method embodiment, the present disclosure further provides an audio signal classification apparatus, and the apparatus may be located in a terminal device or a network device. The audio signal classification apparatus may perform the steps of the foregoing method embodiment.

Figure 13:
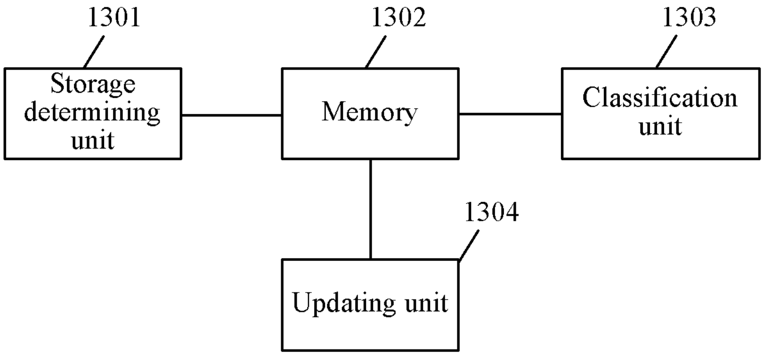
FIG. 13 is a schematic structural diagram of an embodiment of an audio signal classification apparatus according to the present disclosure.

Referring to FIG. 13, the present disclosure provides an embodiment of an audio signal classification apparatus, where the apparatus is configured to classify an input audio signal, and includes a storage determining unit 1301 configured to determine, according to voice activity of a current audio frame, whether to obtain and store a frequency spectrum fluctuation of the current audio frame, where the frequency spectrum fluctuation denotes an energy fluctuation of a frequency spectrum of an audio signal, a memory 1302 configured to store the frequency spectrum fluctuation when the storage determining unit 1301 outputs a result that the frequency spectrum fluctuation needs to be stored, an updating unit 1304 configured to update, according to whether the audio frame is percussive music or activity of a historical audio frame, frequency spectrum fluctuations stored in the memory 1302, and a classification unit 1303 configured to classify the current audio frame as a speech frame or a music frame according to statistics of a part or all of effective data of the frequency spectrum fluctuations stored in the memory 1302, and when statistics of effective data of the frequency spectrum fluctuations satisfy a speech classification condition, classify the current audio frame as a speech frame, or when the statistics of the effective data of the frequency spectrum fluctuations satisfy a music classification condition, classify the current audio frame as a music frame.

In an embodiment, the storage determining unit 1301 is further configured to, when the current audio frame is an active frame, output a result that the frequency spectrum fluctuation of the current audio frame needs to be stored.

In another embodiment, the storage determining unit 1301 is further configured to, when the current audio frame is an active frame, and the current audio frame does not belong to an energy attack, output a result that the frequency spectrum fluctuation of the current audio frame needs to be stored.

In another embodiment, the storage determining unit 1301 is further configured to, when the current audio frame is an active frame, and none of multiple consecutive frames including the current audio frame and a historical frame of the current audio frame belongs to an energy attack, output a result that the frequency spectrum fluctuation of the current audio frame needs to be stored.

In an embodiment, the updating unit 1304 is further configured to, if the current audio frame belongs to percussive music, modify values of the frequency spectrum fluctuations stored in the memory 1302.

In another embodiment, the updating unit 1304 is further configured to if the current audio frame is an active frame, and a previous audio frame is an inactive frame, modify data of other frequency spectrum fluctuations stored in the memory except the frequency spectrum fluctuation of the current audio frame into ineffective data, or if the current audio frame is an active frame, and three consecutive frames before the current audio frame are not all active frames, modify the frequency spectrum fluctuation of the current audio frame into a first value, or if the current audio frame is an active frame, and a historical classification result is a music signal and the frequency spectrum fluctuation of the current audio frame is greater than a second value, modify the frequency spectrum fluctuation of the current audio frame into the second value, where the second value is greater than the first value.

Figure 14:
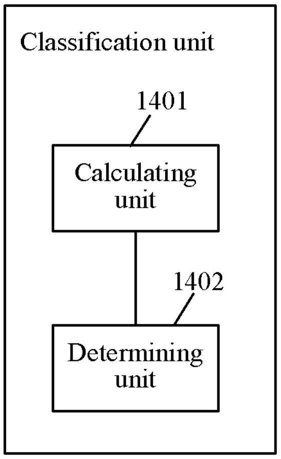
FIG. 14 is a schematic structural diagram of an embodiment of a classification unit according to the present disclosure.

Referring to FIG. 14, in an embodiment, the classification unit 1303 includes a calculating unit 1401 configured to obtain an average value of a part or all of the effective data of the frequency spectrum fluctuations stored in the memory 1302, and a determining unit 1402 configured to compare the average value of the effective data of the frequency spectrum fluctuations with a music classification condition, and when the average value of the effective data of the frequency spectrum fluctuations satisfies the music classification condition, classify the current audio frame as a music frame. Otherwise, classify the current audio frame as a speech frame.

For example, when the obtained average value of the effective data of the frequency spectrum fluctuations is less than a music classification threshold, the current audio frame is classified as a music frame. Otherwise, the current audio frame is classified as a speech frame.

In the foregoing embodiment, because an audio signal is classified according to long-time statistics of frequency spectrum fluctuations, there are relatively few parameters, a recognition rate is relatively high, and complexity is relatively low. In addition, the frequency spectrum fluctuations are adjusted with consideration of factors such as voice activity and percussive music. Therefore, the present disclosure has a higher recognition rate for a music signal, and is suitable for hybrid audio signal classification.

In another embodiment shown in FIGS. 13 and 14, the audio signal classification apparatus further includes a parameter obtaining unit configured to obtain a frequency spectrum high-frequency-band peakiness, a frequency spectrum correlation degree, and a linear prediction residual energy tilt of the current audio frame, where the frequency spectrum high-frequency-band peakiness denotes a peakiness or an energy acutance, on a high frequency band, of a frequency spectrum of the current audio frame. The frequency spectrum correlation degree denotes stability, between adjacent frames, of a signal harmonic structure of the current audio frame, and the linear prediction residual energy tilt denotes an extent to which linear prediction residual energy of the audio signal changes as a linear prediction order increases, where the storage determining unit 1301 is further configured to determine, according to the voice activity of the current audio frame, whether to store the frequency spectrum high-frequency-band peakiness, the frequency spectrum correlation degree, and the linear prediction residual energy tilt. The memory 1302 is further configured to, when the storage determining unit 1301 outputs a result that the frequency spectrum high-frequency-band peakiness, the frequency spectrum correlation degree, and the linear prediction residual energy tilt need to be stored, store the frequency spectrum high-frequency-band peakiness, the frequency spectrum correlation degree, and the linear prediction residual energy tilt, and the classification unit 1303 is further configured to obtain statistics of effective data of the stored frequency spectrum fluctuations, statistics of effective data of stored frequency spectrum high-frequency-band peakiness, statistics of effective data of stored frequency spectrum correlation degrees, and statistics of effective data of stored linear prediction residual energy tilts, and classify the audio frame as a speech frame or a music frame according to the statistics of the effective data, and when the statistics of the effective data of the frequency spectrum fluctuations satisfy a speech classification condition, classify the current audio frame as a speech frame, or when the statistics of the effective data of the frequency spectrum fluctuations satisfy a music classification condition, classify the current audio frame as a music frame.

In an embodiment, the classification unit 1303 further includes a calculating unit 1401 configured to obtain an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and a determining unit 1402 configured to, when one of the following conditions is satisfied, classify the current audio frame as a music frame. Otherwise, classify the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

In the foregoing embodiment, an audio signal is classified according to long-time statistics of frequency spectrum fluctuations, frequency spectrum high-frequency-band peakiness, frequency spectrum correlation degrees, and linear prediction residual energy tilts. Therefore, there are relatively few parameters, a recognition rate is relatively high, and complexity is relatively low. In addition, the frequency spectrum fluctuations are adjusted with consideration of factors such as voice activity and percussive music, and the frequency spectrum fluctuations are modified according to a signal environment in which the current audio frame is located. Therefore, the present disclosure improves a classification recognition rate, and is suitable for hybrid audio signal classification.

Figure 15:
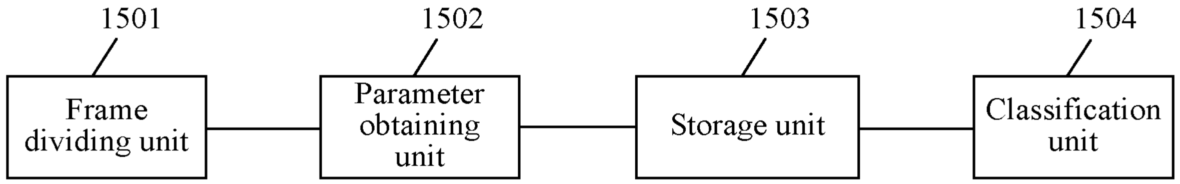
FIG. 15 is a schematic structural diagram of another embodiment of an audio signal classification apparatus according to the present disclosure.

Referring to FIG. 15, the present disclosure provides another embodiment of an audio signal classification apparatus, where the apparatus is configured to classify an input audio signal, and includes a frame dividing unit 1501 configured to perform frame division processing on an input audio signal, a parameter obtaining unit 1502 configured to obtain a linear prediction residual energy tilt of a current audio frame, where the linear prediction residual energy tilt denotes an extent to which linear prediction residual energy of the audio signal changes as a linear prediction order increases, a storage unit 1503 configured to store the linear prediction residual energy tilt, and a classification unit 1504 configured to classify the audio frame according to statistics of a part of data of prediction residual energy tilts in a memory.

Figure 16:
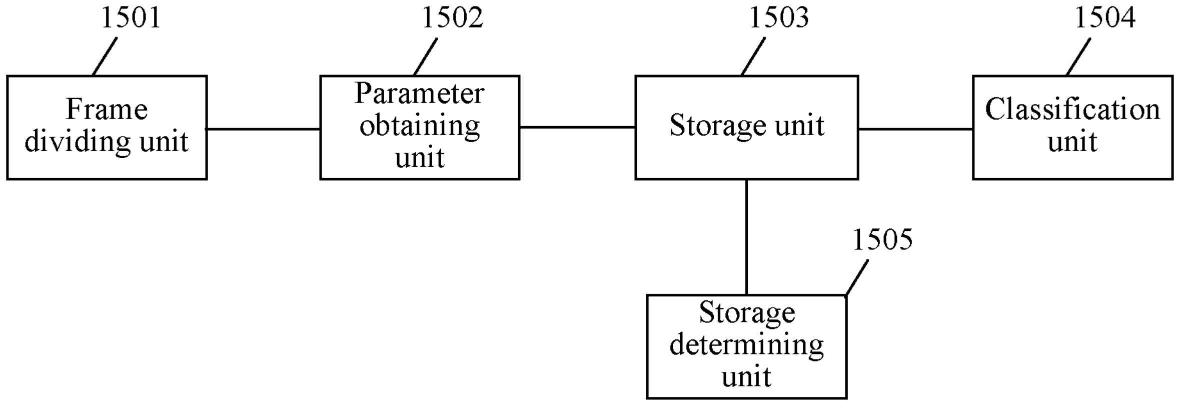
FIG. 16 is a schematic structural diagram of another embodiment of an audio signal classification apparatus according to the present disclosure.

Referring to FIG. 16, the audio signal classification apparatus further includes a storage determining unit 1505 configured to determine, according to voice activity of a current audio frame, whether to store the linear prediction residual energy tilt in the memory, where the storage unit 1503 is further configured to, when the storage determining unit 1505 determines that the linear prediction residual energy tilt needs to be stored, store the linear prediction residual energy tilt in the memory.

In an embodiment, the statistics of the part of the data of the prediction residual energy tilts is a variance of the part of the data of the prediction residual energy tilts, and the classification unit 1504 is further configured to compare the variance of the part of the data of the prediction residual energy tilts with a music classification threshold, and when the variance of the part of the data of the prediction residual energy tilts is less than the music classification threshold, classify the current audio frame as a music frame. Otherwise, classify the current audio frame as a speech frame.

In another embodiment, the parameter obtaining unit 1502 is further configured to obtain a frequency spectrum fluctuation, a frequency spectrum high-frequency-band peakiness, and a frequency spectrum correlation degree of the current audio frame, and store the frequency spectrum fluctuation, the frequency spectrum high-frequency-band peakiness, and the frequency spectrum correlation degree in corresponding memories, and the classification unit 1504 is further configured to obtain statistics of effective data of stored frequency spectrum fluctuations, statistics of effective data of stored frequency spectrum high-frequency-band peakiness, statistics of effective data of stored frequency spectrum correlation degrees, and statistics of effective data of the stored linear prediction residual energy tilts, and classify the audio frame as a speech frame or a music frame according to the statistics of the effective data, where the statistics of the effective data refer to a data value obtained after a calculation operation is performed on the effective data stored in the memories.

Figure 17:
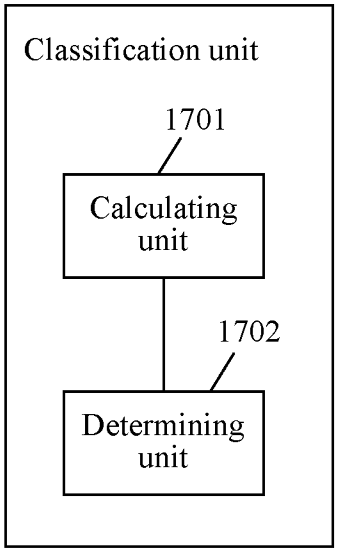
FIG. 17 is a schematic structural diagram of an embodiment of a classification unit according to the present disclosure.

Referring to FIG. 17, in an embodiment, the classification unit 1504 includes a calculating unit 1701 configured to obtain an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and a determining unit 1702 configured to, when one of the following conditions is satisfied, classify the current audio frame as a music frame. Otherwise, classify the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

In another embodiment, the parameter obtaining unit 1502 is further configured to obtain a frequency spectrum tone quantity of the current audio frame and a ratio of the frequency spectrum tone quantity on a low frequency band, and store the frequency spectrum tone quantity and the ratio of the frequency spectrum tone quantity on the low frequency band in memories, and the classification unit 1504 is further configured to obtain statistics of the stored linear prediction residual energy tilts and statistics of stored frequency spectrum tone quantities separately, and classify the audio frame as a speech frame or a music frame according to the statistics of the linear prediction residual energy tilts, the statistics of the frequency spectrum tone quantities, and the ratio of the frequency spectrum tone quantity on the low frequency band, where the statistics of the effective data refer to a data value obtained after a calculation operation is performed on data stored in the memories.

Furthermore, the classification unit 1504 includes a calculating unit 1701 configured to obtain a variance of effective data of the stored linear prediction residual energy tilts and an average value of the stored frequency spectrum tone quantities, and a determining unit 1702 configured to, when the current audio frame is an active frame, and one of the following conditions is satisfied, classify the current audio frame as a music frame. Otherwise, classify the current audio frame as a speech frame. The variance of the linear prediction residual energy tilts is less than a fifth threshold, or the average value of the frequency spectrum tone quantities is greater than a sixth threshold, or the ratio of the frequency spectrum tone quantity on the low frequency band is less than a seventh threshold.

Further, the parameter obtaining unit 1502 obtains the linear prediction residual energy tilt of the current audio frame according to the following formula:

$$epsP\_\text{tilt} = \frac{\sum_{i=1}^{n} epsP(i)\cdot epsP(i+1)}{\sum_{i=1}^{n} epsP(i)\cdot epsP(i)},$$

where epsP(i) denotes prediction residual energy of $i^{th}$-order linear prediction of the current audio frame, and n is a positive integer, denotes a linear prediction order, and is less than or equal to a maximum linear prediction order.

Furthermore, the parameter obtaining unit 1502 is configured to count a quantity of frequency bins of the current audio frame that are on a frequency band from 0 to 8 kHz and have frequency bin peak values greater than a predetermined value, to use the quantity as the frequency spectrum tone quantity, and the parameter obtaining unit 1502 is configured to calculate a ratio of a quantity of frequency bins of the current audio frame that are on a frequency band from 0 to 4 kHz and have frequency bin peak values greater than the predetermined value to the quantity of the frequency bins of the current audio frame that are on the frequency band from 0 to 8 kHz and have frequency bin peak values greater than the predetermined value, to use the ratio as the ratio of the frequency spectrum tone quantity on the low frequency band.

In this embodiment, an audio signal is classified according to long-time statistics of linear prediction residual energy tilts. In addition, both classification robustness and a classification recognition speed are taken into account. Therefore, there are relatively few classification parameters, but a result is relatively accurate, complexity is low, and memory overheads are low.

The present disclosure provides another embodiment of an audio signal classification apparatus, where the apparatus is configured to classify an input audio signal, and includes a frame dividing unit 1501 configured to perform frame division processing on an input audio signal, a parameter obtaining unit 1502 configured to obtain a frequency spectrum fluctuation, a frequency spectrum high-frequency-band peakiness, a frequency spectrum correlation degree, and a linear prediction residual energy tilt of a current audio frame, where the frequency spectrum fluctuation denotes an energy fluctuation of a frequency spectrum of the audio signal. The frequency spectrum high-frequency-band peakiness denotes a peakiness or an energy acutance, on a high frequency band, of a frequency spectrum of the current audio frame. The frequency spectrum correlation degree denotes stability, between adjacent frames, of a signal harmonic structure of the current audio frame, and the linear prediction residual energy tilt denotes an extent to which linear prediction residual energy of the audio signal changes as a linear prediction order increases, a storage unit 1503 configured to store the frequency spectrum fluctuation, the frequency spectrum high-frequency-band peakiness, the frequency spectrum correlation degree, and the linear prediction residual energy tilt, and a classification unit 1504 configured to obtain statistics of effective data of stored frequency spectrum fluctuations, statistics of effective data of stored frequency spectrum high-frequency-band peakiness, statistics of effective data of stored frequency spectrum correlation degrees, and statistics of effective data of stored linear prediction residual energy tilts, and classify the audio frame as a speech frame or a music frame according to the statistics of the effective data, where the statistics of the effective data refer to a data value obtained after a calculation operation is performed on the effective data stored in the memories, where the calculation operation may include an operation for obtaining an average value, an operation for obtaining a variance, or the like.

In an embodiment, the audio signal classification apparatus may further include a storage determining unit 1505 configured to determine, according to voice activity of a current audio frame, whether to store the frequency spectrum fluctuation, the frequency spectrum high-frequency-band peakiness, the frequency spectrum correlation degree, and the linear prediction residual energy tilt of the current audio frame, and the storage unit 1503 is further configured to, when the storage determining unit 1505 outputs a result that the frequency spectrum fluctuation, the frequency spectrum high-frequency-band peakiness, the frequency spectrum correlation degree, and the linear prediction residual energy tilt need to be stored, store the frequency spectrum fluctuation, the frequency spectrum high-frequency-band peakiness, the frequency spectrum correlation degree, and the linear prediction residual energy tilt.

Furthermore, in an embodiment, the storage determining unit 1505 determines, according to the voice activity of the current audio frame, whether to store the frequency spectrum fluctuation in the frequency spectrum fluctuation memory. If the current audio frame is an active frame, the storage determining unit 1505 outputs a result that the parameter needs to be stored. Otherwise, the storage determining unit 1505 outputs a result that the parameter does not need to be stored. In another embodiment, the storage determining unit 1505 determines, according to the voice activity of the audio frame and whether the audio frame is an energy attack, whether to store the frequency spectrum fluctuation in the memory. If the current audio frame is an active frame, and the current audio frame does not belong to an energy attack, the frequency spectrum fluctuation of the current audio frame is stored in the frequency spectrum fluctuation memory. In another embodiment, if the current audio frame is an active frame, and none of multiple consecutive frames including the current audio frame and a historical frame of the current audio frame belongs to an energy attack, the frequency spectrum fluctuation of the audio frame is stored in the frequency spectrum fluctuation memory. Otherwise, the frequency spectrum fluctuation is not stored. For example, if the current audio frame is an active frame, and neither a previous frame of the current audio frame nor a second historical frame of the current audio frame belongs to an energy attack, the frequency spectrum fluctuation of the audio frame is stored in the memory. Otherwise, the frequency spectrum fluctuation is not stored.

In an embodiment, the classification unit 1504 includes a calculating unit 1701 configured to obtain an average value of the effective data of the stored frequency spectrum fluctuations, an average value of the effective data of the stored frequency spectrum high-frequency-band peakiness, an average value of the effective data of the stored frequency spectrum correlation degrees, and a variance of the effective data of the stored linear prediction residual energy tilts separately, and a determining unit 1702 configured to, when one of the following conditions is satisfied, classify the current audio frame as a music frame. Otherwise, classify the current audio frame as a speech frame. The average value of the effective data of the frequency spectrum fluctuations is less than a first threshold, or the average value of the effective data of the frequency spectrum high-frequency-band peakiness is greater than a second threshold, or the average value of the effective data of the frequency spectrum correlation degrees is greater than a third threshold, or the variance of the effective data of the linear prediction residual energy tilts is less than a fourth threshold.

For a specific manner for calculating the frequency spectrum fluctuation, the frequency spectrum high-frequency-band peakiness, the frequency spectrum correlation degree, and the linear prediction residual energy tilt of the current audio frame, refer to the foregoing method embodiment.

Further, the audio signal classification apparatus may further include an updating unit configured to update, according to whether the audio frame is percussive music or activity of a historical audio frame, the frequency spectrum fluctuations stored in the memory. In an embodiment, the updating unit is further configured to if the current audio frame belongs to percussive music, modify values of the frequency spectrum fluctuations stored in the frequency spectrum fluctuation memory. In another embodiment, the updating unit is further configured to, if the current audio frame is an active frame, and a previous audio frame is an inactive frame, modify data of other frequency spectrum fluctuations stored in the memory except the frequency spectrum fluctuation of the current audio frame into ineffective data, or if the current audio frame is an active frame, and three consecutive frames before the current audio frame are not all active frames, modify the frequency spectrum fluctuation of the current audio frame into a first value, or if the current audio frame is an active frame, and a historical classification result is a music signal and the frequency spectrum fluctuation of the current audio frame is greater than a second value, modify the frequency spectrum fluctuation of the current audio frame into the second value, where the second value is greater than the first value.

In this embodiment, classification is performed according to long-time statistics of frequency spectrum fluctuations, frequency spectrum high-frequency-band peakiness, frequency spectrum correlation degrees, and linear prediction residual energy tilts. In addition, both classification robustness and a classification recognition speed are taken into account. Therefore, there are relatively few classification parameters, but a result is relatively accurate, a recognition rate is relatively high, and complexity is relatively low.

The present disclosure provides another embodiment of an audio signal classification apparatus, where the apparatus is configured to classify an input audio signal, and includes a frame dividing unit configured to perform frame division processing on an input audio signal, a parameter obtaining unit configured to obtain a linear prediction residual energy tilt and a frequency spectrum tone quantity of a current audio frame and a ratio of the frequency spectrum tone quantity on a low frequency band, where the epsP_tilt denotes an extent to which linear prediction residual energy of the input audio signal changes as a linear prediction order increases, the Ntonal denotes a quantity of frequency bins of the current audio frame that are on a frequency band from 0 to 8 kHz and have frequency bin peak values greater than a predetermined value, and the ratio_Ntonal_lf of the frequency spectrum tone quantity on the low frequency band denotes a ratio of a low-frequency-band tone quantity to the frequency spectrum tone quantity, where for specific calculation, refer to description of the foregoing embodiment. A storage unit configured to store the linear prediction residual energy tilt, the frequency spectrum tone quantity, and the ratio of the frequency spectrum tone quantity on the low frequency band, and a classification unit configured to obtain statistics of stored linear prediction residual energy tilts and statistics of stored frequency spectrum tone quantities separately, and classify the audio frame as a speech frame or a music frame according to the statistics of the linear prediction residual energy tilts, the statistics of the frequency spectrum tone quantities, and the ratio of the frequency spectrum tone quantity on the low frequency band, where the statistics of the effective data refer to a data value obtained after a calculation operation is performed on data stored in memories.

Furthermore, the classification unit includes a calculating unit configured to obtain a variance of effective data of the stored linear prediction residual energy tilts and an average value of the stored frequency spectrum tone quantities, and a determining unit configured to, when the current audio frame is an active frame, and one of the following conditions is satisfied, classify the current audio frame as a music frame. Otherwise, classify the current audio frame as a speech frame. The variance of the linear prediction residual energy tilts is less than a fifth threshold, or the average value of the frequency spectrum tone quantities is greater than a sixth threshold, or the ratio of the frequency spectrum tone quantity on the low frequency band is less than a seventh threshold.

Furthermore, the parameter obtaining unit obtains the linear prediction residual energy tilt of the current audio frame according to the following formula:

$$epsP\_tilt = \frac{\sum_{i=1}^{n} epsP(i) \cdot epsP(i+1)}{\sum_{i=1}^{n} epsP(i) \cdot epsP(i)},$$

where epsP(i) denotes prediction residual energy of $i^{th}$-order linear prediction of the current audio frame, and n is a positive integer, denotes a linear prediction order, and is less than or equal to a maximum linear prediction order.

Furthermore, the parameter obtaining unit is configured to count a quantity of frequency bins of the current audio frame that are on a frequency band from 0 to 8 kHz and have frequency bin peak values greater than a predetermined value, to use the quantity as the frequency spectrum tone quantity, and the parameter obtaining unit is configured to calculate a ratio of a quantity of frequency bins of the current audio frame that are on a frequency band from 0 to 4 kHz and have frequency bin peak values greater than the predetermined value to the quantity of the frequency bins of the current audio frame that are on the frequency band from 0 to 8 kHz and have frequency bin peak values greater than the predetermined value, to use the ratio as the ratio of the frequency spectrum tone quantity on the low frequency band.

In the foregoing embodiment, an audio signal is classified according to long-time statistics of linear prediction residual energy tilts and frequency spectrum tone quantities and a ratio of a frequency spectrum tone quantity on a low frequency band, therefore, there are relatively few parameters, a recognition rate is relatively high, and complexity is relatively low.

The foregoing audio signal classification apparatus may be connected to different encoders, and encode different signals using the different encoders. For example, the audio signal classification apparatus is connected to two encoders, encodes a speech signal using an encoder based on a speech generating model (such as CELP), and encodes a music signal using an encoder based on conversion (such as an encoder based on MDCT). For a definition and an obtaining method of each specific parameter in the foregoing apparatus embodiment, refer to related description of the method embodiment.

Figure 18:
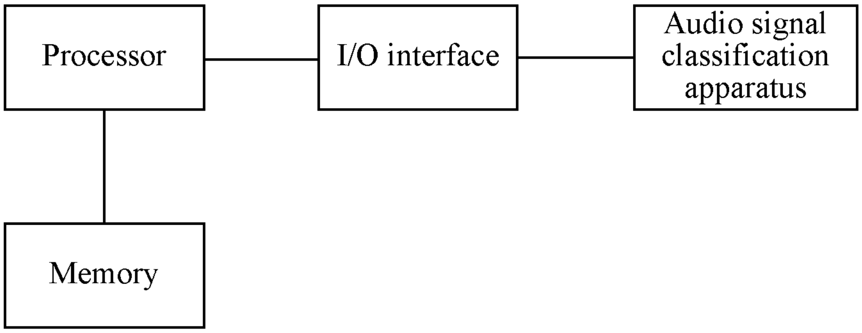
FIG. 18 is a schematic structural diagram of another embodiment of an audio signal classification apparatus according to the present disclosure.

Associated with the foregoing method embodiment, the present disclosure further provides, in FIG. 18, an audio signal classification apparatus 1803, and the apparatus 1803 may be located in a terminal device or a network device with a memory 1804 and an I/O interface 1802. The audio signal classification apparatus 1803 may be implemented by a hardware circuit, or implemented by software in cooperation with hardware. For example, a processor 1801 invokes an audio signal classification apparatus 1803 to implement classification on an audio signal. The audio signal classification apparatus 1803 may perform the various methods and processes in the foregoing method embodiment. For specific modules and functions of the audio signal classification apparatus, refer to related description of the foregoing apparatus embodiment.

Figure 19:
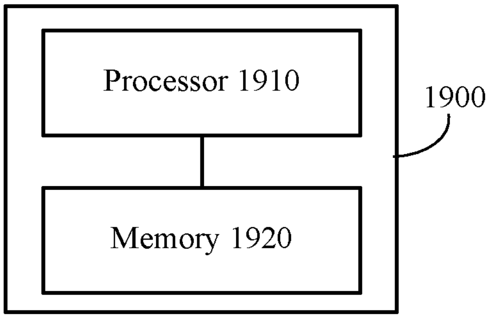
FIG. 19 is a schematic structural diagram of another embodiment of an audio signal classification apparatus according to the present disclosure.

An example of a device 1900 in FIG. 19 is an encoder. The device 1900 includes a processor 1910 and a memory 1920.

The memory 1920 may include a random access memory (RAM), a flash memory, a read-only memory (ROM), a programmable read-only memory (PROM), a non-volatile memory, a register, or the like. The processor 1910 may be a central processing unit (CPU).

The memory 1920 is configured to store an executable instruction. The processor 1910 may execute the executable instruction stored in the memory 1920.

For other functions and operations of the device 1900, refer to processes of the method embodiments in FIG. 3 to FIG. 12, which are not described again herein to avoid repetition.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium may include a magnetic disk, an optical disc, a ROM, or a RAM.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The foregoing are merely exemplary embodiments of the present disclosure. A person skilled in the art may make various modifications and variations to the present disclosure without departing from the spirit and scope of the present disclosure.

The invention claimed is:

1. An audio signal classification method comprising:

storing, based on at least one condition being met, data of a frequency spectrum fluctuation parameter of a current audio frame of an audio signal into a memory where data of frequency spectrum fluctuation parameters of a plurality of audio frames are stored, wherein the at least one condition comprises the current audio frame being an active frame and none of multiple consecutive frames belonging to an energy attack, wherein the multiple consecutive frames comprises the current audio frame and a historical frame of the current audio frame, and wherein the frequency spectrum fluctuation parameter denotes an energy fluctuation of a frequency spectrum of the audio signal;

modifying data of frequency spectrum fluctuation parameters of audio frames preceding the current audio frame stored in the memory into ineffective data when the current audio frame is the active frame and a last audio frame preceding the current audio frame is an inactive frame;

modifying effective data stored in the memory into a first value when a current signal is percussive music, wherein the current signal comprises the current audio frame and a plurality of audio frames preceding the current audio frame;

obtaining statistics of a part or all of the effective data stored in the memory; and classifying the current audio frame as a speech frame or a music frame according to the statistics of a part or all of the effective data stored in the memory.

2. The audio signal classification method of claim 1, wherein, the obtaining statistics of a part or all of the effective data stored in the memory comprises:

obtaining a first group of effective data comprising data of the frequency spectrum fluctuation parameter of the current audio frame and one or more effective data of frequency spectrum fluctuation parameter of one or more audio frames continuously prior to the current audio frame; and obtaining a first average value of the first group of effective data, wherein the classifying the current audio frame comprises: classifying the current audio frame as the music frame based on first conditions being met, wherein the first conditions comprise the first average value being less than a first threshold, and wherein the first value is less than the first threshold.

3. The audio signal classification method of claim 2, wherein, the obtaining statistics of a part or all of the effective data stored in the memory further comprises:

obtaining a second group of effective data comprising data of the frequency spectrum fluctuation parameter of the current audio frame and one or more effective data of frequency spectrum fluctuation parameter of one or more audio frames continuously prior to the current audio frame, wherein a first quantity of data in the first group and a second quantity of data in the second group are different; and obtaining a second average value of the second group of effective data, wherein the first conditions further comprise the second average value being less than a second threshold, and wherein the first value is less than the second threshold.

4. The audio signal classification method of claim 3, wherein, the classifying the current audio frame further comprises: classifying the current audio frame as a speech frame based on second conditions being met, wherein the second conditions comprise that the first average value is greater than a third threshold or a second average value is greater than a fourth threshold.

5. The audio signal classification method of claim 1, wherein the current signal is percussive music when fourth-conditions are met, and wherein the fourth conditions comprise that: a relatively acute energy protrusion occurs in the current signal in both a short time and a long time; and the current signal has no noticeable voiced sound characteristic.

6. The audio signal classification method of claim 5, wherein the conditions further comprise that several historical frames before the current audio frame are mainly music frames.

7. The audio signal classification method of claim 5, wherein the fourth conditions further comprise that: no subframe of the current signal has a noticeable voiced sound characteristic; and a noticeable increase occurs in a time domain envelope of the current signal relative to a long-time average of the time domain envelope.

8. An audio signal classification apparatus, comprising:

a memory configured to store instructions; and one or more processors in communication with the memory and configured to execute the instructions to:

store, based on at least one condition being met, data of a frequency spectrum fluctuation parameter of a current audio frame of an audio signal into the memory where a plurality of frequency spectrum fluctuation parameters of a plurality of audio frames are stored, wherein the at least one condition comprises the current audio frame being an active frame and none of multiple consecutive frames belonging to an energy attack, wherein the multiple consecutive frames comprises the current audio frame and a historical frame of the current audio frame, and wherein the frequency spectrum fluctuation parameter denotes an energy fluctuation of a frequency spectrum of the audio signal;

modify data of frequency spectrum fluctuation parameters of audio frames preceding the current audio frame stored in the memory into ineffective data when the current audio frame is the active frame and a last audio frame preceding the current audio frame is an inactive frame; and modify effective data stored in the memory into a first value when a current signal is percussive music, wherein the current signal comprises the current audio frame and a plurality of audio frames proceeding the current audio frame;

obtain statistics of a part or all of the effective data stored in the memory; and classify the current audio frame as a speech frame or a music frame according to the statistics of a part or all of the effective data stored in the memory.

9. The audio signal classification apparatus of claim 8, wherein, to obtain statistics of a part or all of the effective data stored in the memory, the one or more processors are configured to execute the instructions to:

obtain a first group of effective data comprising data of the frequency spectrum fluctuation parameter of the current audio frame and one or more effective data of frequency spectrum fluctuation parameter of one or more audio frames continuously prior to the current audio frame; and obtain a first average value of the first group of effective data, wherein to classify the current audio frame, the one or more processors are configured to execute the instructions to: classify the current audio frame as the music frame based on first conditions being met, wherein the first conditions comprise the first average value being less than a first threshold, and wherein the first value is less than the first threshold.

10. The audio signal classification apparatus of claim 9, wherein, to obtain statistics of a part or all of the effective data stored in the memory, the one or more processors execute the instructions further to:

obtain a second group of effective data comprising data of the frequency spectrum fluctuation parameter of the current audio frame and one or more effective data of frequency spectrum fluctuation parameters of one or more audio frames continuously prior to the current audio frame, wherein a first quantity of data in the first group and a second quantity of data in the second group are different; and obtain a second average value of the second group of effective data, wherein the first conditions further comprise the second average value being less than a second threshold, and wherein the first value is less than the second threshold.

11. The audio signal classification apparatus of claim 10, wherein to classify the current audio frame, the one or more processors are further configured to execute the instructions to classify the current audio frame as a speech frame based on second conditions being met, wherein the second conditions comprise that the first average value is greater than a third threshold or a second average value is greater than a fourth threshold.

12. The audio signal classification apparatus of claim 8, wherein the current signal is percussive music when conditions are met, and wherein the fourth conditions comprise that: a relatively acute energy protrusion occurs in the current signal in both a short time and a long time; and the current signal has no noticeable voiced sound characteristic.

13. The audio signal classification apparatus of claim 12, wherein the conditions further comprise that several historical frames before the current audio frame are mainly music frames.

14. The audio signal classification apparatus of claim 12, wherein the conditions further comprise that: no subframe of the current signal has a noticeable voiced sound characteristic; and a noticeable increase occurs in a time domain envelope of the current signal relative to a long-time average of the time domain envelope.

15. A computer program product comprising instructions for storage on a non-transitory medium that, when executed by a processor of an audio signal classification apparatus, cause the audio signal classification apparatus to:

store, based on at least one condition being met, data of a frequency spectrum fluctuation parameter of a current audio frame of an audio signal into a memory where a plurality of frequency spectrum fluctuation parameters of a plurality of audio frames are stored, wherein the at least one condition comprises the current audio frame being an active frame and none of multiple consecutive frames belonging to an energy attack, wherein the multiple consecutive frames comprises the current audio frame and a historical frame of the current audio frame, and wherein the frequency spectrum fluctuation parameter denotes an energy fluctuation of a frequency spectrum of the audio signal;

modify data of frequency spectrum fluctuation parameters of audio frames preceding the current audio frame stored in the memory into ineffective data when the current audio frame is the active frame and a last audio frame preceding the current audio frame is an inactive frame;

modify effective data stored in the memory into a first value when a current signal is percussive music, wherein the current signal comprises the current audio frame and a plurality of audio frames proceeding the current audio frame;

obtain statistics of a part or all of the effective data stored in the memory; and classify the current audio frame as a speech frame or a music frame according to the statistics of a part or all of the effective data stored in the memory.

16. The audio signal classification apparatus of claim 15, wherein, to obtain statistics of a part or all of the effective data stored in the memory, the instructions, when executed by the processor, cause the audio signal classification apparatus to:

obtain a first group of effective data comprising data of the frequency spectrum fluctuation parameter of the current audio frame and one or more effective data of frequency spectrum fluctuation parameter of one or more audio frames continuously prior to the current audio frame; and obtain a first average value of the first group of effective data, wherein to classify the current audio frame, the instructions, when executed by the processor, cause the audio signal classification apparatus to: classify the current audio frame as the music frame based on first conditions being met, wherein the first conditions comprise the first average value being less than a first threshold, and wherein the first value is less than the first threshold.

17. The audio signal classification apparatus of claim 16, wherein, to obtain statistics of a part or all of the effective data stored in the memory, the instructions, when executed by the processor, further cause the audio signal classification apparatus to:

obtain a second group of effective data comprising data of the frequency spectrum fluctuation parameter of the current audio frame and one or more effective data of frequency spectrum fluctuation parameters of one or more audio frames continuously prior to the current audio frame, wherein a first quantity of data in the first group and a second quantity of data in the second group are different; and obtain a second average value of the second group of effective data, wherein the first conditions further comprise the second average value being less than a second threshold, and wherein the first value is less than the second threshold.

18. The audio signal classification apparatus of claim 17, wherein to classify the current audio frame, the instructions, when executed by the processor, further cause the audio signal classification apparatus to: classify the current audio frame as a speech frame based on second conditions being met, wherein the second conditions comprise that the first average value is greater than a third threshold or a second average value is greater than a fourth threshold.

19. The audio signal classification apparatus of claim 15, wherein the current signal is percussive music when conditions are met, and wherein the conditions comprise that: a relatively acute energy protrusion occurs in the current signal in both a short time and a long time; the current signal has no noticeable voiced sound characteristic; and the conditions further comprise that several historical frames before the current audio frame are mainly music frames.

20. The audio signal classification apparatus of claim 15, wherein the current signal is percussive music when conditions are met, and wherein the conditions comprise that: a relatively acute energy protrusion occurs in the current signal in both a short time and a long time; the current signal has no noticeable voiced sound characteristic; no subframe of the current signal has a noticeable voiced sound characteristic; and a noticeable increase occurs in a time domain envelope of the current signal relative to a long-time average of the time domain envelope.

* * * * *